United States Patent
You et al.

(10) Patent No.: US 9,949,295 B2
(45) Date of Patent: Apr. 17, 2018

(54) TERMINAL AND METHOD FOR RECEIVING DATA THROUGH UNLICENSED BAND

(71) Applicant: LG ELECTRONICS INC., Seoul (KR)

(72) Inventors: Hyangsun You, Seoul (KR); Yunjung Yi, Seoul (KR); Joonkui Ahn, Seoul (KR); Hanbyul Seo, Seoul (KR); Jonghyun Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 15/324,664

(22) PCT Filed: Jun. 29, 2015

(86) PCT No.: PCT/KR2015/006630
§ 371 (c)(1),
(2) Date: Jan. 6, 2017

(87) PCT Pub. No.: WO2016/006854
PCT Pub. Date: Jan. 14, 2016

(65) Prior Publication Data
US 2017/0208627 A1 Jul. 20, 2017

Related U.S. Application Data

(60) Provisional application No. 62/021,664, filed on Jul. 7, 2014.

(51) Int. Cl.
*H04W 72/00* (2009.01)
*H04W 74/08* (2009.01)
(Continued)

(52) U.S. Cl.
CPC ... *H04W 74/0816* (2013.01); *H04W 72/0446* (2013.01); *H04W 72/1289* (2013.01); *H04J 11/00* (2013.01); *H04W 84/12* (2013.01)

(58) Field of Classification Search
CPC ..... H04W 24/00; H04W 72/04; H04W 88/06; H04W 28/04; H04W 74/0816; H04W 72/0446; H03W 72/1289
(Continued)

(56) References Cited

U.S. PATENT DOCUMENTS 9,526,111 B2 * 12/2016 Jose ................. H04W 72/1278
2012/0077510 A1 * 3/2012 Chen .................... H04W 28/26
455/452.1
(Continued)

FOREIGN PATENT DOCUMENTS

| KR | 1020140007947 A | 1/2014 |
| WO | 2013069918 A1 | 5/2013 |
| WO | 2013087835 A1 | 6/2013 |

OTHER PUBLICATIONS

LG Electronics, "Consideration on LTE operation in unlicensed spectrum", Workshop for LTE Unlicensed band, RWS-140031, Jun. 5, 2014, 13 pages.
(Continued)

*Primary Examiner* — Danh Le
(74) *Attorney, Agent, or Firm* — Lee Hong Degerman Kang Waimey

(57) ABSTRACT

Provided in one embodiment of the present invention is a method for receiving data through an unlicensed band. The method is a method for receiving data using a terminal using both a licensed band and an unlicensed band, for the purpose of communicating with a mobile communication base station, and comprises the steps of: transmitting through the unlicensed band, a Clear To Send (CTS) frame defined by a wireless LAN (WLAN), before receiving a data channel from the mobile communication base station; and a specific frame or a specific subframe receiving, through the unlicensed band and from the mobile communication base station, a data channel, after transmitting the CTS frame, (Continued)

wherein the specific frame or the specific subframe by which the data channel is received can be a frame or a subframe used in a mobile communication system which is operated on the licensed band.

10 Claims, 35 Drawing Sheets

(51) Int. Cl.
*H04W 72/12* (2009.01)
*H04W 72/04* (2009.01)
*H04W 84/12* (2009.01)
*H04J 11/00* (2006.01)

(58) Field of Classification Search
USPC ............... 455/452.1, 552.1, 450; 370/329
See application file for complete search history.

(56) References Cited

U.S. PATENT DOCUMENTS

| | | | |
|---|---|---|---|
| 2012/0164948 A1* | 6/2012 | Narasimha | H04L 1/16 455/63.1 |
| 2014/0044105 A1 | 2/2014 | Bontu et al. | |
| 2014/0126504 A1 | 5/2014 | Jung et al. | |
| 2014/0287769 A1* | 9/2014 | Taori | H04W 74/0808 455/450 |
| 2015/0049709 A1* | 2/2015 | Damnjanovic | H04L 5/0055 370/329 |
| 2015/0312793 A1* | 10/2015 | Jeon | H04W 28/0205 370/329 |
| 2016/0073344 A1* | 3/2016 | Vutukuri | H04W 52/0216 370/252 |
| 2016/0227578 A1* | 8/2016 | Lee | H04W 74/004 |
| 2017/0142235 A1* | 5/2017 | Zhang | H04L 45/74 |

OTHER PUBLICATIONS

3rd Generation Partnership Project, "Technical Specification Group Radio Access Network; Evolved Universal Terrestrial Radio Access (E-UTRA); Physical Channels and Modulation (Release 10)", 3GPP TS 36.211 V10.4.0, Dec. 2011, 101 pages.

3rd Generation Partnership Project, "Technical Specification Group Radio Access Network; Evolved Universal Terrestrial Radio Access (E-UTRA); Multiplexing and channel coding (Release 10)", 3GPP TS 36.212 V10.2.0, Jun. 2011, section 5.3.3.1.1., pp. 56-57 (4 pages provided).

"IEEE Standard for Information Technology—Telecommunications and Information Exchange Between Systems Local and Metropolitan Area Networks—Specific Requirements—Part 11: Wireless LAN Medium Access Control (MAC) and Physical Layer (PHY) Specifications", IEEE P802.11-REVmc/D2.0, Oct. 2013, section 8.3.1.2.-8.3.1.3., pp. 533 (3 pages provided).

PCT International Application No. PCT/KR2015/006630, International Search Report dated Sep. 30, 2015, 2 pages.

* cited by examiner

FIG. 9
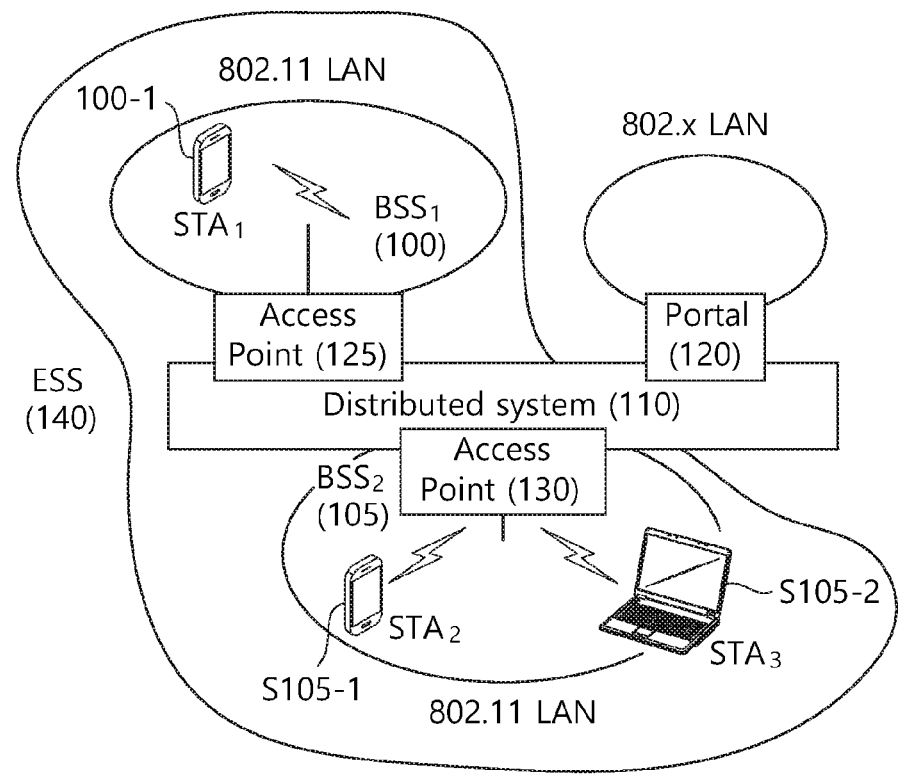
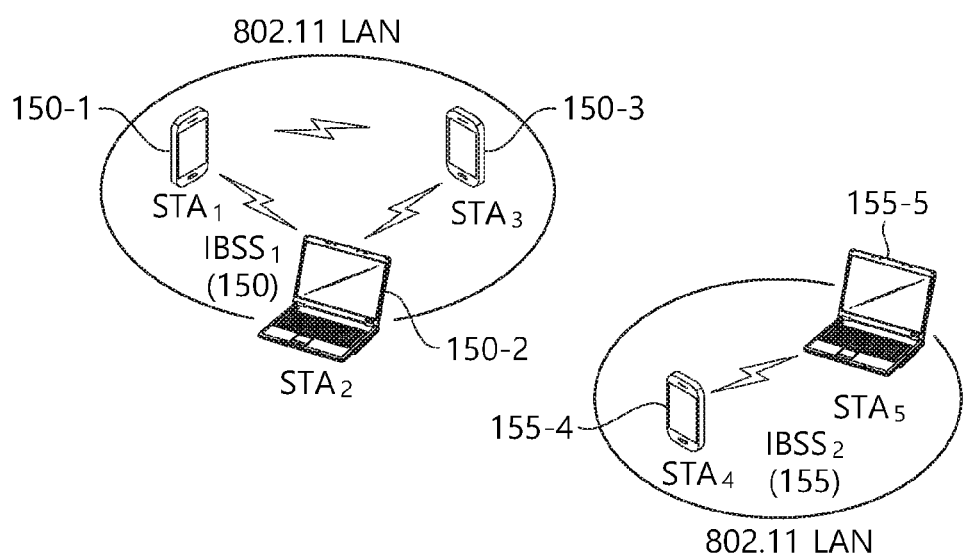

TERMINAL AND METHOD FOR RECEIVING DATA THROUGH UNLICENSED BAND

CROSS-REFERENCE TO RELATED APPLICATIONS

This application is the National Stage filing under 35 U.S.C. 371 of International Application No. PCT/KR2015/006630, filed on Jun. 29, 2015, which claims the benefit of U.S. Provisional Application No. 62/021,664, filed on Jul. 7, 2014, the contents of which are all hereby incorporated by reference herein in their entirety.

BACKGROUND OF THE INVENTION

Field of the Invention

The present invention relates to mobile communication.

Related Art

3rd generation partnership project (3GPP) long term evolution (LTE) evolved from a universal mobile telecommunications system (UMTS) is introduced as the 3GPP release 8. The 3GPP LTE uses orthogonal frequency division multiple access (OFDMA) in a downlink, and uses single carrier-frequency division multiple access (SC-FDMA) in an uplink. The 3GPP LTE employs multiple input multiple output (MIMO) having up to four antennas. In recent years, there is an ongoing discussion on 3GPP LTE-advanced (LTE-A) evolved from the 3GPP LTE.

As disclosed in 3GPP TS 36.211 V10.4.0 (2011-12) "Evolved Universal Terrestrial Radio Access (E-UTRA); Physical Channels and Modulation (Release 10)", 3GPP LTE/LTE-A may divide the physical channel into a downlink channel, i.e., a physical downlink shared channel (PDSCH) and a physical downlink control channel (PDCCH), and an uplink channel, i.e., a physical uplink shared channel (PUSCH) and a physical uplink control channel (PUCCH).

Meanwhile, as more communication devices require more communication capacities, efficient utilization of limited frequency band in the next-generation wireless communication system has become more important requirement.

In a cellular communication system such as the LTE system, it is also considering a method to utilize, to offload traffic, an unlicensed band such as 2.4 GHz band on which an existing WLAN system uses or an unlicensed band such as 5 GHz band which has recently got attention.

Basically, since the unlicensed band assumes a method of transmitting and receiving wirelessly with a contention between each communication node, it requires to confirm that other communication nodes do not transmit a signal, by performing, by the each communication node, a channel sensing, before transmitting a signal. This is called as a CCA (Clear Channel Assessment), and a base station (eNB) or an user equipment (UE) of the LTE system should be also able to perform the CCA to transmit a signal in the unlicensed band (for convenience, referred to as a LTE-U band). Thus, that base station or UE may be referred to as an LTE-U base station or UE.

Further, the other communication nodes such as WLAN etc., as well do not trigger any interference, by performing the CCA, when the eNB or the UE in the LTE system transmit a signal. For instance, a CCA threshold in the WLAN standard (801.11ac), is regulated to be as −62 dBm for the non-WLAN signal, and −82 dBm for the WLAN signal, which means that the STA (Station) or the AP (Access Point), for instance, does not transmit a signal in order not to trigger any interference, if any signal other than the WLAN signal is received with the power of more than −62 dBm.

Specifically, the STA or the AP, in the WLAN system, may perform the CCA and a signal transmission unless any signal with the level of greater than CCA threshold, is detected for more than 4 us.

Specifically, a process is started when a node wishing to transmit data transmits RTS (Request To Send) frame in WLAN.

A destination node responds to the signal by transmitting a CTS (Clear To Send) frame, in a wireless environment when there are no other signals of being transmitting and receiving and thus the transmission is available.

All other nodes receiving the RTS frame or the CTS frame is prevented from transmitting data for a determined time. A time when the transmission is prevented may be indicated by information included in the RTS frame or the CTS frame. This protocol set forth a premise that all nodes have the same transmission range.

RTS/CTS are an additional and selective method for implementing CSMA/CA (Carrier Sense Multiple Access with Collision Avoidance) virtual carrier sensing.

Since only a physical carrier sensing is used in the basic 802.11 (WLAN) standard, there is a problem that a hidden node or terminal problem may be occurred.

SUMMARY OF THE INVENTION

Accordingly, the disclosure of the specification has been made in an effort to solve the problem.

A method in accordance with a disclosure of the present specification, to achieve the above-mentioned goal, is a method of receiving data by a terminal using both a licensed band and an unlicensed band for communicating with a mobile communication base station, the method comprises the steps of: transmitting, through the unlicensed band, a Clear To Send (CTS) frame defined by a WLAN (Wireless Local Area Network) system, before receiving a data channel from the mobile communication base station; and receiving, through the unlicensed band and from the mobile communication base station, a data channel and a specific frame or a specific subframe, after transmitting the CTS frame, and wherein the specific frame or a specific subframe by which the data channel is received, is a frame or a subframe used in a mobile communication system by which is operated on the licensed band.

In an aspect, the mobile communication system may be a LTE (Long Term Evolution) or a LTE-A (Long Term Evolution-Advanced) system.

In an aspect, the method may further comprise receiving, through the licensed band and from the base station, a CTS request indication to request of transmitting the CTS frame.

In an aspect, the CTS request indication may be transmitted through a PDCCH (Physical Downlink Control Channel) or a higher layer signaling.

In addition, the CTS request indication may include at least one of information on a timing at which the CTS frame is to be transmitted, information on a value of duration included in a duration field of the CTS frame, information on a timing at which a data transmission channel is started, and information on a duration during which the data transmission channel is to be progressed.

In addition, the method may further comprise transmitting a CTS indication to indicate that the CTS frame has been transmitted through the licensed band to the base station.

In an aspect, the CTS indication may include at least one of information on a timing at which a data transmission channel is started, and information on a duration during which the data transmission channel is to be progressed.

A terminal in accordance with a disclosure of the present specification, to achieve the above-mentioned goal, is a terminal of receiving data using both a licensed band and an unlicensed band for communicating with a mobile communication base station, comprise a Radio Frequency (RF) unit; and a processor configured to control the RF unit to: transmit, through the unlicensed band, a Clear To Send (CTS) frame defined by a WLAN (Wireless Local Area Network) system, before receiving a data channel from the mobile communication base station; and receive, through the unlicensed band and from the mobile communication base station, a data channel and a specific frame or a specific subframe, after transmitting the CTS frame, and wherein the specific frame or a specific subframe by which the data channel is received, is a frame or a subframe used in a mobile communication system by which is operated on the licensed band.

In an aspect, the processor may further control the RF unit to receive, through the licensed band and from the base station, a CTS request indication to request of transmitting the CTS frame.

In an aspect, the processor may further control the RF unit to transmit a CTS indication to indicate that the CTS frame has been transmitted through the licensed band to the base station.

In accordance with the present disclosure, the above-mentioned problem of a prior art is to be solved. More particularly, in accordance with the present disclosure, the present disclosure has a merit that the hidden node problem is to be solved, by transmitting and receiving a data frame in a stable and efficient manner in the unlicensed band through the RTS and/or CTS frame, in the wireless communication system using both the licensed band and the unlicensed band.

BRIEF DESCRIPTION OF THE DRAWINGS

FIG. 9 is a conceptual diagram illustrating a structure of a wireless local area network (WLAN).

DESCRIPTION OF EXEMPLARY EMBODIMENTS

Figure 1:
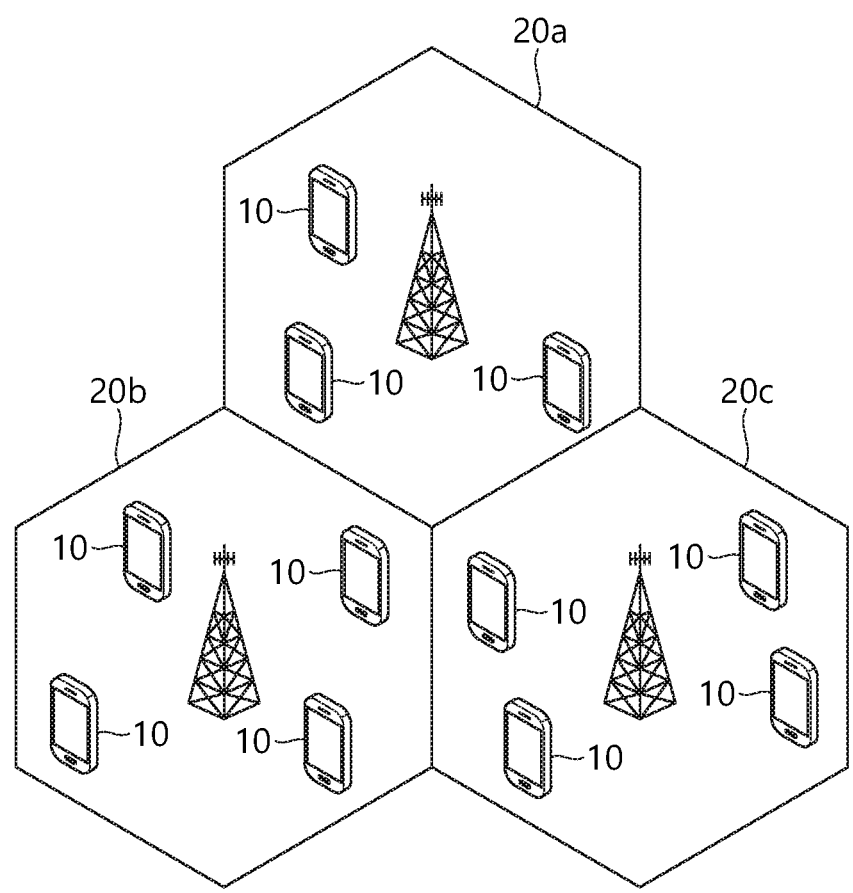
FIG. 1 illustrates a wireless communication system.

Hereinafter, based on 3rd Generation Partnership Project (3GPP) long term evolution (LTE) or 3GPP LTE-advanced (LTE-A), the present invention will be applied. This is just an example, and the present invention may be applied to various wireless communication systems. Hereinafter, LTE includes LTE and/or LTE-A.

The technical terms used herein are used to merely describe specific embodiments and should not be construed as limiting the present invention. Further, the technical terms used herein should be, unless defined otherwise, interpreted as having meanings generally understood by those skilled in the art but not too broadly or too narrowly. Further, the technical terms used herein, which are determined not to exactly represent the spirit of the invention, should be replaced by or understood by such technical terms as being able to be exactly understood by those skilled in the art. Further, the general terms used herein should be interpreted in the context as defined in the dictionary, but not in an excessively narrowed manner.

The expression of the singular number in the present invention includes the meaning of the plural number unless the meaning of the singular number is definitely different from that of the plural number in the context. In the following description, the term 'include' or 'have' may represent the existence of a feature, a number, a step, an operation, a component, a part or the combination thereof described in the present invention, and may not exclude the existence or addition of another feature, another number, another step, another operation, another component, another part or the combination thereof.

The terms 'first' and 'second' are used for the purpose of explanation about various components, and the components are not limited to the terms 'first' and 'second'. The terms 'first' and 'second' are only used to distinguish one component from another component. For example, a first component may be named as a second component without deviating from the scope of the present invention.

It will be understood that when an element or layer is referred to as being "connected to" or "coupled to" another element or layer, it can be directly connected or coupled to the other element or layer or intervening elements or layers may be present. In contrast, when an element is referred to as being "directly connected to" or "directly coupled to" another element or layer, there are no intervening elements or layers present.

Hereinafter, exemplary embodiments of the present invention will be described in greater detail with reference to the accompanying drawings. In describing the present invention, for ease of understanding, the same reference numerals are used to denote the same components throughout the drawings, and repetitive description on the same components will be omitted. Detailed description on well-known arts which are determined to make the gist of the invention unclear will be omitted. The accompanying drawings are provided to merely make the spirit of the invention readily understood, but not should be intended to be limiting of the invention. It should be understood that the spirit of the invention may be expanded to its modifications, replacements or equivalents in addition to what is shown in the drawings.

As used herein, 'base station' generally refers to a fixed station that communicates with a wireless device and may be denoted by other terms such as eNB (evolved-NodeB), BTS (base transceiver system), or access point.

As used herein, 'user equipment (UE)' may be stationary or mobile, and may be denoted by other terms such as device, wireless device, terminal, MS (mobile station), UT (user terminal), SS (subscriber station), MT (mobile terminal) and etc.

FIG. 1 Illustrates a Wireless Communication System.

As seen with reference to FIG. 1, the wireless communication system includes at least one base station (BS) 20. Each base station 20 provides a communication service to specific geographical areas (generally, referred to as cells) 20a, 20b, and 20c. The cell can be further divided into a plurality of areas (sectors).

The UE generally belongs to one cell and the cell to which the UE belong is referred to as a serving cell. A base station that provides the communication service to the serving cell is referred to as a serving BS. Since the wireless communication system is a cellular system, another cell that neighbors to the serving cell is present. Another cell which neighbors to the serving cell is referred to a neighbor cell. A base station that provides the communication service to the neighbor cell is referred to as a neighbor BS. The serving cell and the neighbor cell are relatively decided based on the UE.

Hereinafter, a downlink means communication from the base station 20 to the UE1 10 and an uplink means communication from the UE 10 to the base station 20. In the downlink, a transmitter may be a part of the base station 20 and a receiver may be a part of the UE 10. In the uplink, the transmitter may be a part of the UE 10 and the receiver may be a part of the base station 20.

Meanwhile, the wireless communication system may be generally divided into a frequency division duplex (FDD) type and a time division duplex (TDD) type. According to the FDD type, uplink transmission and downlink transmission are achieved while occupying different frequency bands. According to the TDD type, the uplink transmission and the downlink transmission are achieved at different time while occupying the same frequency band. A channel response of the TDD type is substantially reciprocal. This means that a downlink channel response and an uplink channel response are approximately the same as each other in a given frequency area. Accordingly, in the TDD based wireless communication system, the downlink channel response may be acquired from the uplink channel response. In the TDD type, since an entire frequency band is time-divided in the uplink transmission and the downlink transmission, the downlink transmission by the base station and the uplink transmission by the terminal may not be performed simultaneously. In the TDD system in which the uplink transmission and the downlink transmission are divided by the unit of a subframe, the uplink transmission and the downlink transmission are performed in different subframes.

Hereinafter, the LTE system will be described in detail.

Figure 2:
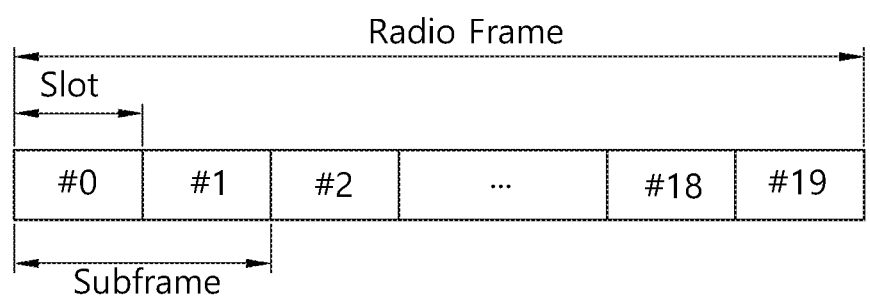
FIG. 2 illustrates a structure of a radio frame according to frequency division duplex (FDD) of 3rd generation partnership project (3GPP) long term evolution (LTE).

FIG. 2 Illustrates a Structure of a Radio Frame According to FDD of 3rd Generation Partnership Project (3GPP) Long Term Evolution (LTE).

The radio frame of FIG. 2 may be found in the section 5 of 3GPP TS 36.211 V10.4.0 (2011-12) "Evolved Universal Terrestrial Radio Access (E-UTRA); Physical Channels and Modulation (Release 10)".

The radio frame includes 10 subframes indexed 0 to 9. One subframe includes two consecutive slots. Accordingly, the radio frame includes 20 slots. The time taken for one subframe to be transmitted is denoted TTI (transmission time interval). For example, the length of one subframe may be 1 ms, and the length of one slot may be 0.5 ms.

The structure of the radio frame is for exemplary purposes only, and thus the number of subframes included in the radio frame or the number of slots included in the subframe may change variously.

Meanwhile, one slot may include a plurality of OFDM symbols. The number of OFDM symbols included in one slot may vary depending on a cyclic prefix (CP).

Figure 3:
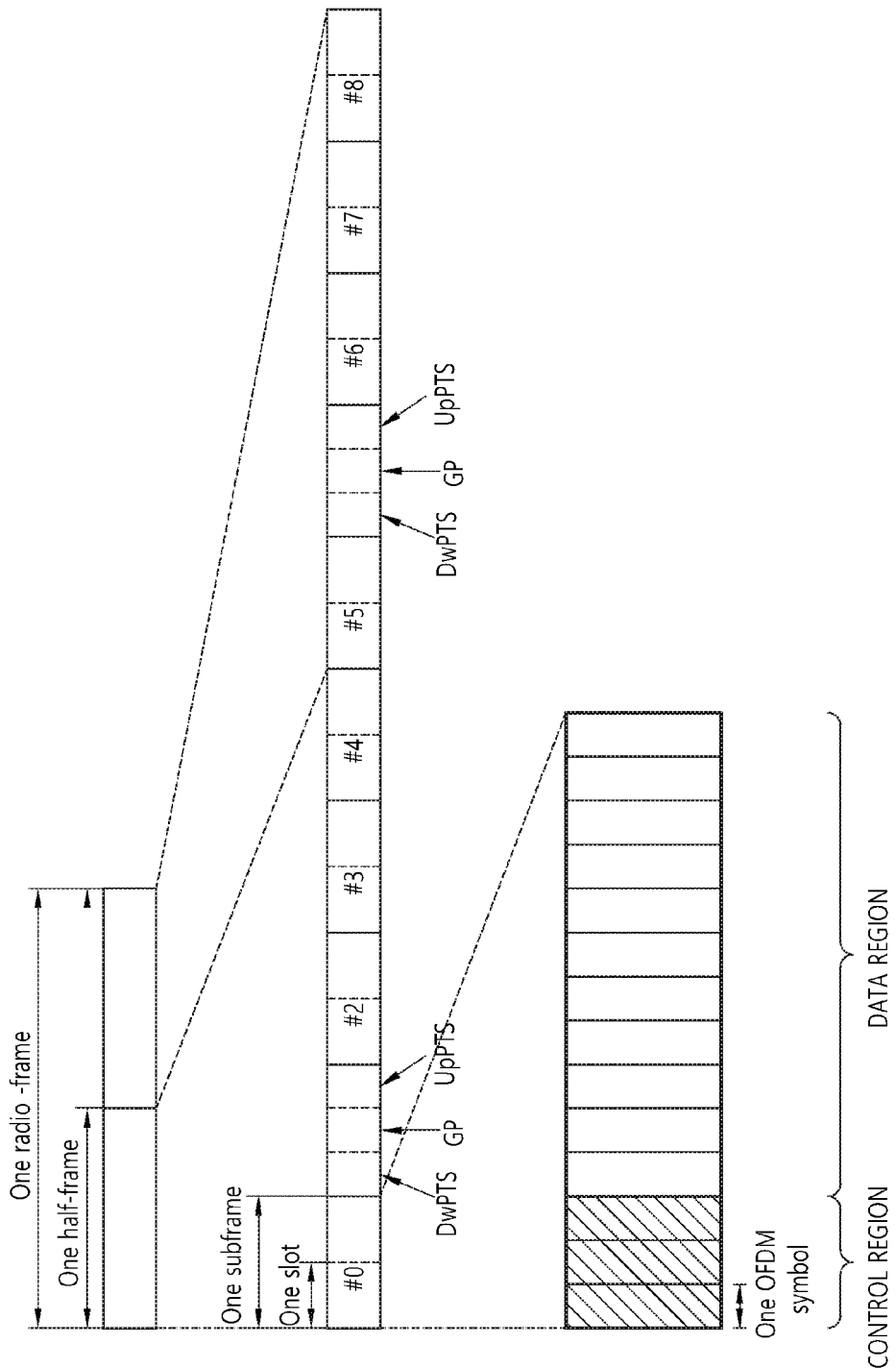
FIG. 3 is a block diagram showing the structure of a wireless protocol on the control plane.

FIG. 3 Illustrates a Structure of a Downlink Radio Frame According to TDD in 3GPP LTE.

For this, 3GPP TS 36.211 V10.4.0 (2011-23) "Evolved Universal Terrestrial Radio Access (E-UTRA); Physical Channels and Modulation (Release 8)", Ch. 4 may be referenced, and this is for TDD (time division duplex).

Subframes having index #1 and index #6 are denoted special subframes, and include a DwPTS(Downlink Pilot Time Slot: DwPTS), a GP(Guard Period) and an UpPTS (Uplink Pilot Time Slot). The DwPTS is used for initial cell search, synchronization, or channel estimation in a terminal. The UpPTS is used for channel estimation in the base station and for establishing uplink transmission sync of the terminal. The GP is a period for removing interference that arises on uplink due to a multi-path delay of a downlink signal between uplink and downlink.

In TDD, a DL (downlink) subframe and a UL (Uplink) co-exist in one radio frame. Table 1 shows an example of configuration of a radio frame.

TABLE 1

| UL-DL configuration | Switch-point periodicity | Subframe index | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

'D' denotes a DL subframe, 'U' a UL subframe, and 'S' a special subframe. When receiving a UL-DL configuration from the base station, the terminal may be aware of whether a subframe is a DL subframe or a UL subframe according to the configuration of the radio frame.

Figure 4:
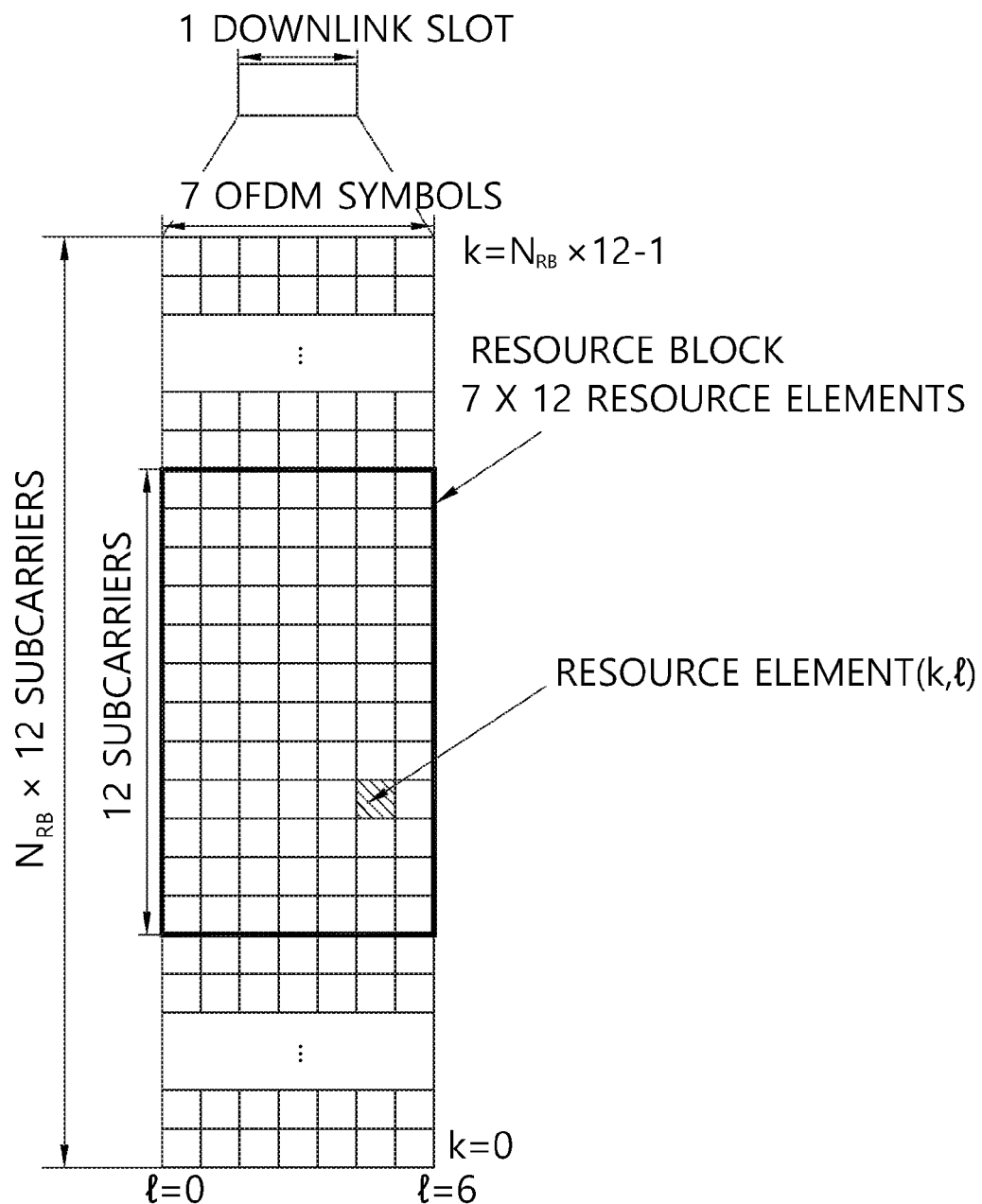
FIG. 4 illustrates an example of a resource grid for one uplink or downlink slot in 3GPP LTE.

FIG. 4 Illustrates an Example of a Resource Grid for One Uplink or Downlink Slot in 3GPP LTE.

Referring to FIG. 4, the uplink slot includes a plurality of OFDM (orthogonal frequency division multiplexing) symbols in the time domain and NRB resource blocks (RBs) in the frequency domain. For example, in the LTE system, the number of resource blocks (RBs), i.e., NRB, may be one from 6 to 110.

The resource block is a unit of resource allocation and includes a plurality of sub-carriers in the frequency domain. For example, if one slot includes seven OFDM symbols in the time domain and the resource block includes 12 sub-carriers in the frequency domain, one resource block may include 7×12 resource elements (REs).

Figure 5:
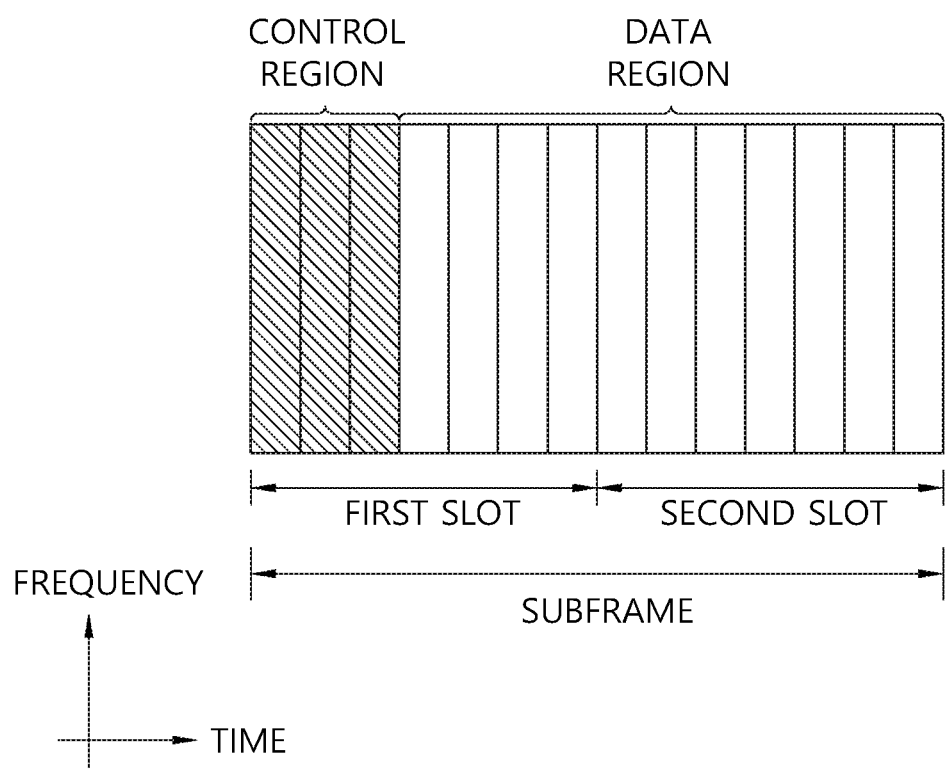
FIG. 5 illustrates a structure of a downlink subframe.

FIG. 5 Illustrates a Structure of a Downlink Subframe.

In FIG. 5, assuming the normal CP, one slot includes seven OFDM symbols, by way of example.

The DL (downlink) subframe is split into a control region and a data region in the time domain. The control region includes up to first three OFDM symbols in the first slot of the subframe. However, the number of OFDM symbols included in the control region may be changed. A PDCCH (physical downlink control channel) and other control channels are assigned to the control region, and a PDSCH is assigned to the data region.

The physical channels in 3GPP LTE may be classified into data channels such as PDSCH (physical downlink shared channel) and PUSCH (physical uplink shared channel) and control channels such as PDCCH (physical downlink control channel), PCFICH (physical control format indicator channel), PHICH (physical hybrid-ARQ indicator channel) and PUCCH (physical uplink control channel).

The PCFICH transmitted in the first OFDM symbol of the subframe carries CIF (control format indicator) regarding the number (i.e., size of the control region) of OFDM symbols used for transmission of control channels in the subframe. The wireless device first receives the CIF on the PCFICH and then monitors the PDCCH.

Unlike the PDCCH, the PCFICH is transmitted through a fixed PCFICH resource in the subframe without using blind decoding.

The PHICH carries an ACK (positive-acknowledgement)/NACK (negative-acknowledgement) signal for a UL HARQ (hybrid automatic repeat request). The ACK/NACK signal for UL (uplink) data on the PUSCH transmitted by the wireless device is transmitted on the PHICH.

The PBCH (physical broadcast channel) is transmitted in the first four OFDM symbols in the second slot of the first subframe of the radio frame. The PBCH carries system information necessary for the wireless device to communicate with the base station, and the system information transmitted through the PBCH is denoted MIB (master information block). In comparison, system information transmitted on the PDSCH indicated by the PDCCH is denoted SIB (system information block).

The PDCCH may carry activation of VoIP (voice over internet protocol) and a set of transmission power control commands for individual UEs in some UE group, resource allocation of an upper layer control message such as a random access response transmitted on the PDSCH, system information on DL-SCH, paging information on PCH, resource allocation information of UL-SCH (uplink shared channel), and resource allocation and transmission format of DL-SCH (downlink-shared channel). A plurality of PDCCHs may be transmitted in the control region, and the terminal may monitor the plurality of PDCCHs. The PDCCH is transmitted on one CCE (control channel element) or aggregation of some consecutive CCEs. The CCE is a logical allocation unit used for providing a coding rate per radio channel's state to the PDCCH. The CCE corresponds to a plurality of resource element groups. Depending on the relationship between the number of CCEs and coding rates provided by the CCEs, the format of the PDCCH and the possible number of PDCCHs are determined.

The control information transmitted through the PDCCH is denoted downlink control information (DCI). The DCI may include resource allocation of PDSCH (this is also referred to as DL (downlink) grant), resource allocation of PUSCH (this is also referred to as UL (uplink) grant), a set of transmission power control commands for individual UEs in some UE group, and/or activation of VoIP (Voice over Internet Protocol).

The base station determines a PDCCH format according to the DCI to be transmitted to the terminal and adds a CRC (cyclic redundancy check) to control information. The CRC is masked with a unique identifier (RNTI; radio network temporary identifier) depending on the owner or purpose of the PDCCH. In case the PDCCH is for a specific terminal, the terminal's unique identifier, such as C-RNTI (cell-RNTI), may be masked to the CRC. Or, if the PDCCH is for a paging message, a paging indicator, for example, P-RNTI (paging-RNTI) may be masked to the CRC. If the PDCCH is for a system information block (SIB), a system information identifier, SI-RNTI (system information-RNTI), may be masked to the CRC. In order to indicate a random access response that is a response to the terminal's transmission of a random access preamble, an RA-RNTI (random access-RNTI) may be masked to the CRC.

In 3GPP LTE, blind decoding is used for detecting a PDCCH. The blind decoding is a scheme of identifying whether a PDCCH is its own control channel by demasking a desired identifier to the CRC (cyclic redundancy check) of a received PDCCH (this is referred to as candidate PDCCH) and checking a CRC error. The base station determines a PDCCH format according to the DCI to be transmitted to the wireless device, then adds a CRC to the DCI, and masks a unique identifier (this is referred to as RNTI (radio network temporary identifier) to the CRC depending on the owner or purpose of the PDCCH.

A control region in a subframe includes a plurality of control channel elements (CCEs). The CCE is a logical allocation unit used to provide the PDCCH with a coding rate depending on a radio channel state, and corresponds to a plurality of resource element groups (REGs). The REG includes a plurality of resource elements. According to an association relation of the number of CCEs and the coding rate provided by the CCEs, a PDCCH format and the number of bits of an available PDCCH are determined.

One REG includes 4 REs. One CCE includes 9 REGs. The number of CCEs used to configure one PDCCH may be selected from a set {1, 2, 4, 8}. Each element of the set {1, 2, 4, 8} is referred to as a CCE aggregation level.

The BS determines the number of CCEs used in transmission of the PDCCH according to a channel state. For example, a wireless device having a good DL channel state can use one CCE in PDCCH transmission. A wireless device having a poor DL channel state can use 8 CCEs in PDCCH transmission.

A control channel consisting of one or more CCEs performs interleaving on an REG basis, and is mapped to a physical resource after performing cyclic shift based on a cell identifier (ID).

Meanwhile, a UE is unable to know that the PDCCH of its own is transmitted on which position within control region and using which CCE aggregation level or DCI format. Since a plurality of PDCCHs may be transmitted in one subframe, the UE monitors a plurality of PDCCHs in every subframe. Here, the monitoring is referred to try to decode the PDCCH by the UE according to the PDCCH format.

In 3GPP LTE, in order to decrease the load owing to the blind decoding, a search space is used. The search space may be referred to a monitoring set of CCE for the PDCCH. The UE monitors the PDCCH within the corresponding search space.

When a UE monitors the PDCCH based on the C-RNTI, the DCI format and the search space which is to be monitored are determined according to the transmission mode of the PDSCH. The table below represents an example of the PDCCH monitoring in which the C-RNTI is setup.

TABLE 2

| Transmission mode | DCI format | Search space | Transmission mode of PDSCH according to PDCCH |
|---|---|---|---|
| Transmission mode 1 | DCI format 1A | Public service and terminal specific | Single antenna port, port 0 |
| | DCI format 1 | Terminal specific | Single antenna port, port 0 |
| Transmission mode 2 | DCI format 1A | Public service and terminal specific | Transmit diversity |
| | DCI format 1 | Terminal specific | Transmit diversity |
| Transmission mode 3 | DCI format 1A | Public service and terminal specific | Transmit diversity |
| | DCI format 2A | Terminal specific | CDD(Cyclic Delay Diversity) or transmit diversity |
| Transmission mode 4 | DCI format 1A | Public service and terminal specific | Transmit diversity |
| | DCI format 2 | Terminal specific | Closed-loop spatial multiplexing |
| Transmission mode 5 | DCI format 1A | Public service and terminal specific | Transmit diversity |
| | DCI format 1D | Terminal specific | MU-MIMO(Multi-user Multiple Input Multiple Output) |
| Transmission mode 6 | DCI format 1A | Public service and terminal specific | Transmit diversity |
| | DCI format 1B | Terminal specific | Closed-loop spatial multiplexing |
| Transmission mode 7 | DCI format 1A | Public service and terminal specific | If the number of PBCH transmisison ports is 1, single antenna port, port 0. Otherwise, transmit diversity |
| | DCI format 1 | Terminal specific | Single antenna port, port 5 |
| Transmission mode 8 | DCI format 1A | Public service and terminal specific | If the number of PBCH transmisison ports is 1, single antenna port, port 0. Otherwise, transmit diversity |
| | DCI format 2B | Terminal specific | Dual layer transmisison (port 7 or 8), or single antenna port, port 7 or 8 |
| Transmission mode 9 | DCI format 1A | Public service and terminal specific | Non-MBSFN subframe: if the number of PBCH antenna ports is 1, port 0 is used as independent antenna port. Otherwise, transmit Diversity MBSFN subframe: port 7 as independent antenna port |
| | DCI format 2C | Terminal specific | 8 transmisison layers, ports 7-14 are used or port 7 or 8 is used as independent antenna port |
| Transmission mode 10 | DCI 1A | Public service and terminal specific | Non-MBSFN subframe: if the number of PBCH antenna ports is 1, port 0 is used as independent antenna port. Otherwise, transmit Diversity MBSFN subframe: port 7 as independent antenna port |
| | DCI format 2D | Terminal specific | 8 transmisison layers, ports 7-14 are used or port 7 or 8 is used as independent antenna port |

The usage of the DCI format is classified as shown in Table 3 below.

TABLE 3

| DCI format | Contents |
|---|---|
| DCI format 0 | Used in PUSCH scheduling |
| DCI format 1 | Used in scheduling of one PDSCH codeword |
| DCI format 1A | Used in compact scheduling of one PDSCH codeword and random access process |
| DCI format 1B | Used in compact scheduling of one PDSCH codeword having precoding information |
| DCI format 1C | Used in very compact scheduling of one PDSCH codeword |
| DCI format 1D | Used in precoding and compact scheduling of one PDSCH codeword having power offset information |
| DCI format 2 | Used in PDSCH scheduling of terminals configured in closed-loop spatial multiplexing mode |
| DCI format 2A | Used in PDSCH scheduling of terminals configured in open-loop spatial multiplexing mode |
| DCI format 2B | DCI format 2B is used for resouce allocation for dual-layer beam-forming of PDSCH. |
| DCI format 2C | DCI format 2C is used for resouce allocation for closed-loop SU-MIMO or MU-MIMO operation to 8 layers. |
| DCI format 2D | DCI format 2C is used for resouce allocation to 8 layers. |
| DCI format 3 | Used to transmit TPC command of PUCCH and PUSCH having 2 bit power adjustments |
| DCI format 3A | Used to transmit TPC command of PUCCH and PUSCH having 1 bit power adjustment |
| DCI format 4 | Used in PUSCH scheduling of uplink (UP) operated in multi-antenna port transmisison mode |

For example, DCI format 0 includes fields listed in the following table with reference to section 5.3.3.1.1 of 3GPP TS 36.212 V10.2.0 (2011-06)

TABLE 4

| Field | Number of bits |
|---|---|
| Carrier indicator | 0 or 3 bits |
| Flag for format0/format1A differentiation | 1 bit |
| FH(Frequency hopping) flag | 1 bit |
| Resource block assignment and hopping resource allocation | |
| MCS(Modulation and coding scheme) and RV(redundancy version) | 5 bits |
| NDI(New data indicator) | 1 bit |
| TPC | 2 bits |
| Cyclic shift for DM RS and OCC index | 3 bits |
| UL index | 2 bits |
| DAI(Downlink Assignment Index) | 2 bit |
| CSI request | 1 or 2 bits |
| SRS request | 0 or 1 bits |
| Resource allocation type | 1 bit |

Figure 6:
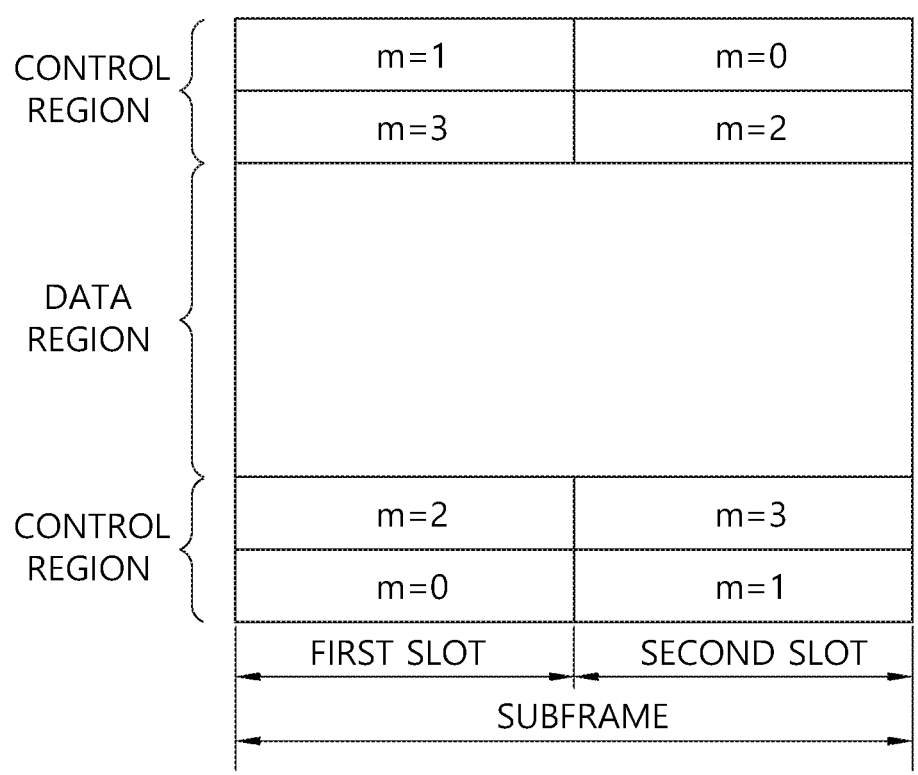
FIG. 6 illustrates a structure of an uplink subframe in 3GPP LTE.

FIG. 6. Illustrates a Structure of an Uplink Subframe in 3GPP LTE.

Referring to FIG. 6, an uplink subframe may be divided into a control region and a data region in a frequency domain. The control region is allocated a PUCCH for transmission of uplink control information. The data region is allocated a PUSCH for data transmission (along with control information in some cases).

A PUCCH for one UE is allocated a RB pair in a subframe. RBs in the RB pair take up different subcarriers in each of first and second slots. A frequency occupied by the RBs in the RB pair allocated to the PUCCH changes with respect to a slot boundary, which is described as the RB pair allocated to the PUCCH having been frequency-hopped on the slot boundary.

A UE transmits uplink control information through different subcarriers according to time, thereby obtaining a frequency diversity gain. m is a location index indicating the logical frequency-domain location of an RB pair allocated for a PUCCH in a subframe.

Uplink control information transmitted on a PUCCH may include a HARQ ACK/NACK, a channel quality indicator (CQI) indicating the state of a downlink channel, a scheduling request (SR) which is an uplink radio resource allocation request, or the like.

A PUSCH is mapped to a uplink shared channel (UL-SCH) as a transport channel. Uplink data transmitted on a PUSCH may be a transport block as a data block for a UL-SCH transmitted during a TTI. The transport block may be user information. Alternatively, the uplink data may be multiplexed data. The multiplexed data may be the transport block for the UL-SCH multiplexed with control information. For example, control information multiplexed with data may include a CQI, a precoding matrix indicator (PMI), an HARQ, a rank indicator (RI), or the like. Alternatively, the uplink data may include only control information.

A carrier aggregation system is described hereinafter.

A carrier aggregation system aggregates a plurality of component carriers (CCs). A conventional definition of a cell is changed according to carrier aggregation. According to carrier aggregation, a cell may denote a combination of a downlink component carrier and an uplink component carrier or a downlink component carrier alone.

Further, in carrier aggregation, cells may be divided into a primary cell, a secondary cell, and a serving cell. A primary cell denotes a cell operating at a primary frequency, in which a UE performs an initial connection establishment procedure or a connection reestablishment procedure with a BS or which is designated as a primary cell in a handover procedure. A secondary cell denotes a cell operating at a secondary frequency, which is configured once RRC connection is established and is used to provide an additional radio resource.

As described above, the carrier aggregation system may support a plurality of component carriers (CCs), that is, a plurality of serving cells, unlike a single carrier system.

The carrier aggregation system may support cross-carrier scheduling. Cross-carrier scheduling is a scheduling method for performing resource allocation for a PDSCH transmitted through a different component carrier through a PDCCH transmitted through a specific component carrier and/or resource allocation for a PUSCH transmitted through a component carrier different from a component carrier basically linked with the specific component carrier.

Figure 7:
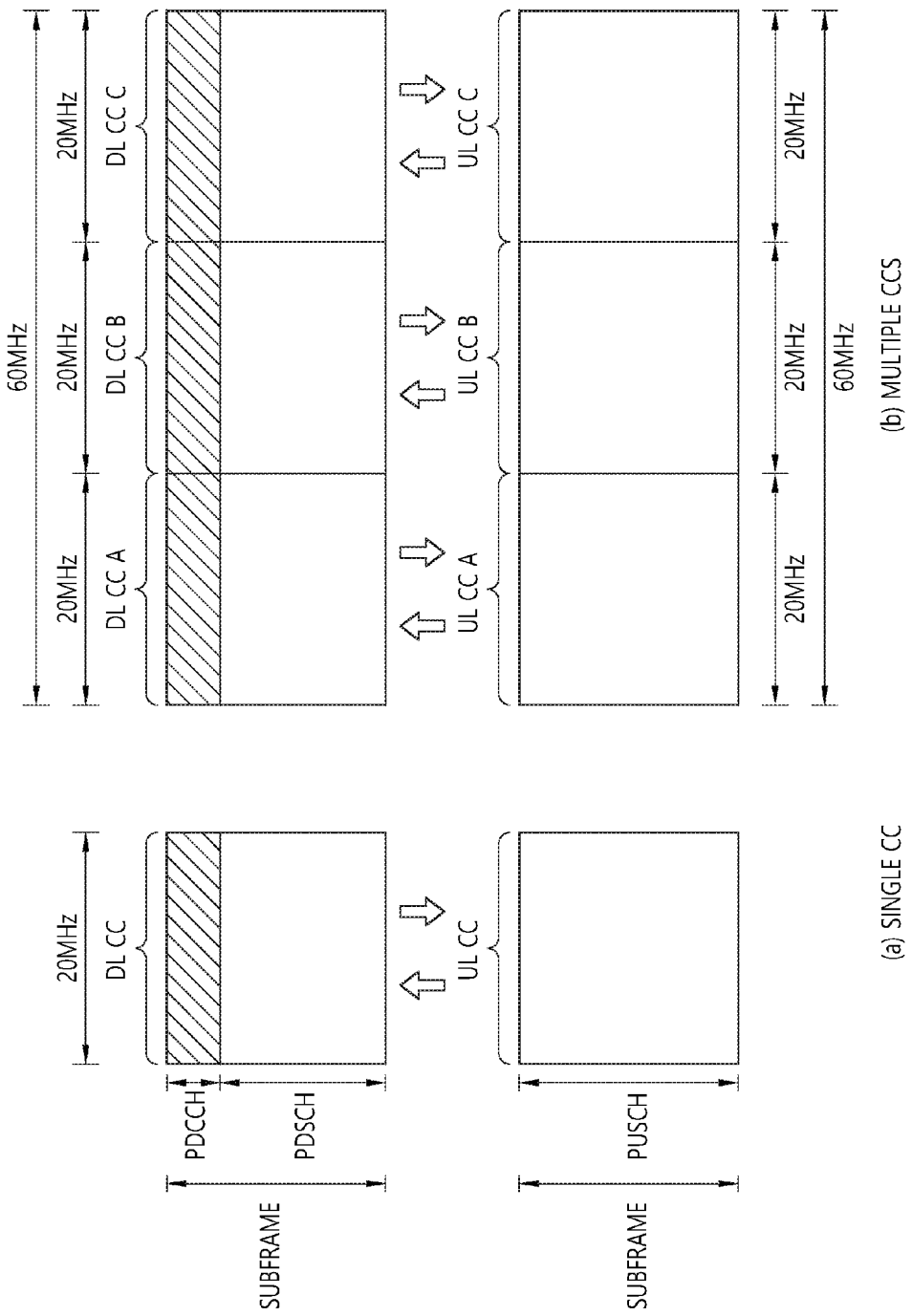
FIG. 7 illustrates an example of comparison between a single carrier system and a carrier aggregation system.

FIG. 7 Illustrates an Example of Comparison Between a Single Carrier System and a Carrier Aggregation System.

Referring to (a) of FIG. 7, the single carrier system supports only one carrier for an uplink and a downlink for a UE. Although there may be various bandwidths of carriers, a UE is assigned one carrier. Referring to (b) of FIG. 7, the carrier aggregation (CA) system may assign a plurality of component carriers (DL CC A to C and UL CC A to C) for a UE. A component carrier (CC) denotes a carrier used in the carrier aggregation system and may be abbreviated to a carrier. For example, three 20-MHz component carriers may be assigned to allocate a 60-MHz bandwidth for the terminal.

Carrier aggregation systems may be divided into a contiguous carrier aggregation system in which aggregated carriers are contiguous and a non-contiguous carrier aggregation system in which aggregated carriers are spaced apart from each other. Hereinafter, when simply referring to a carrier aggregation system, it should be understood as including both a case where component carriers are contiguous and a case where component carriers are non-contiguous. Different numbers of component carriers may be aggregated for a downlink and an uplink. A case where the number of downlink component carriers and the number of uplink component carriers are the same is referred to as symmetric aggregation, and a case where the numbers are different is referred to as asymmetric aggregation.

When one or more component carriers are aggregated, component carriers to be aggregated may use the same bandwidths as adopted in an existing system for backward compatibility with the existing system. For example, the 3GPP LTE system supports bandwidths of 1.4 MHz, 3 MHz, 5 MHz, 10 MHz, 15 MHz, and 20 MHz, and the 3GPP LTE A system may configure a broad band of 20 MHz or more only using the bandwidths of the 3GPP LTE system. Alternatively, instead of using the bandwidths of the existing system, new bandwidths may be defined to configure a broad band.

In order to transmit/receive packet data through a specific secondary cell in carrier aggregation, a UE first needs to complete configuration for the specific secondary cell. Here, configuration means that reception of system information necessary for data transmission/reception in a cell is completed. For example, configuration may include an overall process of receiving common physical-layer parameters necessary for data transmission and reception, media access control (MAC)-layer parameters, or parameters necessary for a specific operation in an RRC layer. A configuration-completed cell is in a state where packet transmission and reception is immediately possible upon receiving information indicating packet data may be transmitted.

A configuration-completed cell may be in an activated or deactivated state. Here, the activated state means that the cell performs data transmission or reception or is ready for data transmission or reception. A UE may monitor or receive a control channel (PDCCH) and a data channel (PDSCH) of an activated cell in order to identify resources (which may be a frequency or time) assigned thereto.

The deactivated state means that transmission or reception of traffic data is impossible and measurement or transmission/reception of minimal information is possible. A UE may receive system information (SI) necessary for receiving a packet from a deactivated cell. However, the UE does not monitor or receive a control channel (PDCCH) and data channel (PDSCH) of the deactivated cell in order to identify resources (which may be a frequency or time) assigned thereto.

Figure 8:
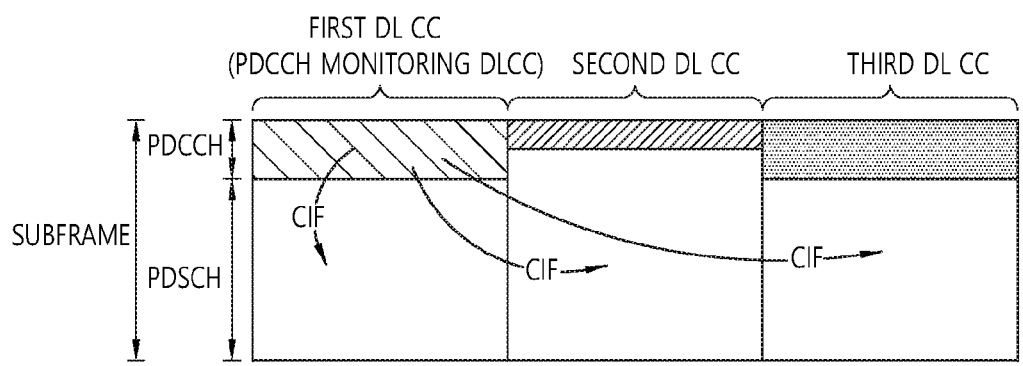
FIG. 8 illustrates cross-carrier scheduling in a carrier aggregation system.

FIG. 8 Illustrates Cross-carrier Scheduling in a Carrier Aggregation System.

Referring to FIG. 8, a BS may configure a PDCCH monitoring DL CC (monitoring CC) set. The PDCCH monitoring DL CC set includes some of all aggregated DL CCs, and a UE performs PDCCH monitoring/decoding only on a DL CC included in the PDCCH monitoring DL CC set when cross-carrier scheduling is configured. That is, the BS transmits a PDCCH with respect to a PDSCH/PUSCH to be scheduled only through a DL CC included in the PDCCH monitoring DL CC set. The PDCCH monitoring DL CC set may be configured to be UE-specific, UE group-specific, or cell-specific.

FIG. 8 illustrates an example in which three DL CCs (DL CC A, DL CC B, and DL CC C) are aggregated and DL CC A is set as a PDCCH monitoring DL CC. A UE may receive a DL grant with respect to a PDSCH of DL CC A, DL CC B, and DL CC C through a PDCCH of DL CC A. DCI transmitted through the PDCCH of DL CC A includes a CIF to indicate which DL CC the DCI is about.

Hereinafter, a wireless local area network (WLAN) system will be discussed in detail.

In addition, the present specification quotes together contents disclosed in a IEEE standard 802.11™ (2012) and 802.11 ac™ (2013).

FIG. 9 is a Conceptual Diagram Illustrating a Structure of a Wireless Local Area Network (WLAN).

An upper part of FIG. 9 shows the structure of the IEEE (institute of electrical and electronic engineers) 802.11 infrastructure network.

Referring to the upper part of FIG. 9, the WLAN system may include one or more infra-structure BSSs 100 and 105 (as will be described as BSS in below). The BSS 100 or 105 is a set of an AP such as AP (access point) 125 and an STA such as STA1 (station) 100-1 that may successfully sync with each other to communicate with each other and is not the concept to indicate a particular area. The BSS 105 may include one AP 130 and one or more STAs 105-1 and 105-2 connectable to one AP 130.

The BSS may include at least one STA, APs 125 and 130 providing a distribution service, and a distribution system (DS) 110 connecting multiple APs.

The distribution system 110 may implement an extended service set (ESS) 140 by connecting a number of BSSs 100 and 105. The ESS 140 may be used as a term to denote one network configured of one or more APs 125 and 130 connected through the distribution system 110. The APs included in one ESS 140 may have the same SSID (service set identification).

The portal 120 may function as a bridge that performs connection of the WLAN network (IEEE 802.11) with other network (for example, 802.X).

In the infrastructure network as shown in the upper part of FIG. 9, a network between the APs 125 and 130 and a network between the APs 125 and 130 and the STAs 100-1, 105-1, and 105-2 may be implemented. However, without the APs 125 and 130, a network may be established between the STAs to perform communication. The network that is established between the STAs without the APs 125 and 130 to perform communication is defined as an ad-hoc network or an independent BSS (basic service set).

A lower part of FIG. 9 is a conceptual diagram illustrating an independent BSS.

Referring to the lower part of FIG. 9, the independent BSS (IBSS) is a BSS operating in ad-hoc mode. The IBSS does not include an AP, so that it lacks a centralized management entity. In other words, in the IBSS, the STAs 150-1, 150-2, 150-3, 155-4 and 155-5 are managed in a distributed manner. In the IBSS, all of the STAs 150-1, 150-2, 150-3, 155-4 and 155-5 may be mobile STAs, and access to the distribution system is not allowed so that the IBSS forms a self-contained network.

The STA is some functional medium that includes a medium access control (MAC) following the IEEE (Institute of Electrical and Electronics Engineers) 802.11 standards and that includes a physical layer interface for radio media, and the term "STA" may be used, in its broad sense definition, including both an AP and a non-AP STA (station).

The STA may be referred to by various terms such as mobile terminal, wireless device, wireless transmit/receive unit (WTRU), user equipment (UE), mobile station (MS), mobile subscriber unit, or simply referred to as a user.

Figure 10A:
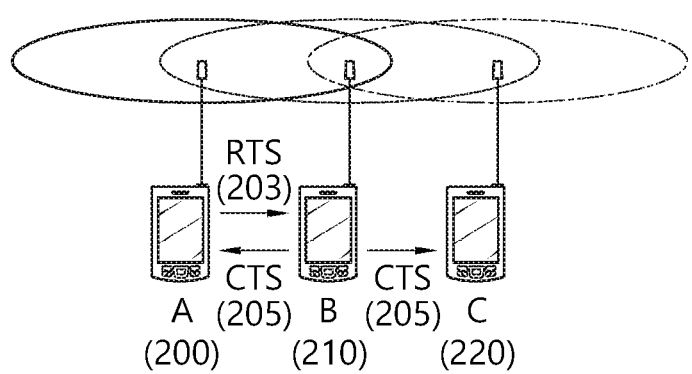
FIG. 10A and FIG. 10B is a conceptual diagram illustrating a structure of the WLAN system.
Figure 10B:
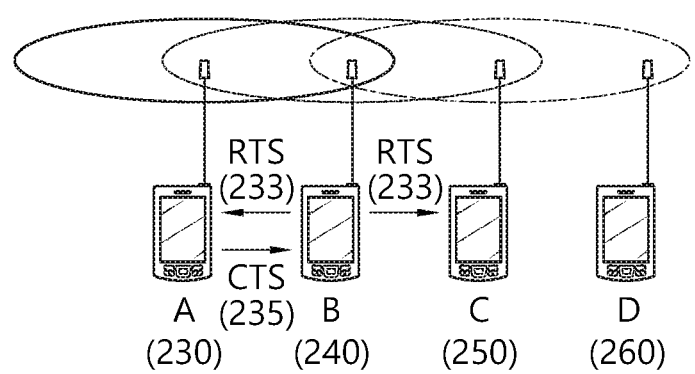

FIG. 10A and FIG. 10B is a Conceptual Diagram Illustrating a Structure of the WLAN System.

Referring to FIG. 10A and FIG. 10B, in order to solve a hidden node issue and an exposed node issue, short signaling frames, such as an RTS frame and a CTS frame etc. may be used. Surrounding STAs may be aware of whether or not data between two STAs is transmitted or received, based on the RTS frame and the CTS frame.

FIG. 2A shows a method of transmitting an RTS frame 203 and a CTS frame 205 in order to solve a hidden node issue.

The case may be assumed that both a STA A 200 and a STA C 220 attempt to transmit data to an STA B 210. The STA A 200 may transmit the RTS frame 203 to the STA B 210 before transmitting a data frame, the STA B 210 may transmit the CTS frame 205 to the STA A 200. A STA C 220 may overhear the CTS frame 205 and may be aware of a transmission of frame from the STA A 200 through the medium to the STA B 210. The STA C 220 may configure a network allocation vector (NAV) until the transmission of frame from the STA A 200 to the STA B 210. A collision may be avoided among frames due to a hidden node, by using the above-mentioned method.

FIG. 10B shows a method of transmitting an RTS frame 233 and a CTS frame 235 in order to solve an exposed node issue.

A STA C 250 may determine whether a collision is occurred or not, when a frame is transmitted to another STA 260, based on a monitoring on the RTS frame 233 and the CTS frame 235 between a STA A 230 and a STAB 240.

The STA B 240 may transmit the RTS frame 233 to the STA A 230, the STA A 230 may transmit the CTS frame 235 to the STA B 240. The STA C 250 has overheard only the RTS frame 233 transmitted by the STA B 240 and has not overheard the CTS frame 235 transmitted by the STA A 230. Thus, the STA C 250 may be aware that the STA A 230 is placed outside the carrier sensing range of the STA C 250. Accordingly, the STA C 250 can transmit data to the STA D 260.

The RTS frame format and the CTS frame format are disclosed in the 8.3.1.2 RTS frame format and 8.3.1.3 CTS frame format of an IEEE P802.11-REVmc™/D2.0, October 2013.

Figure 11A:
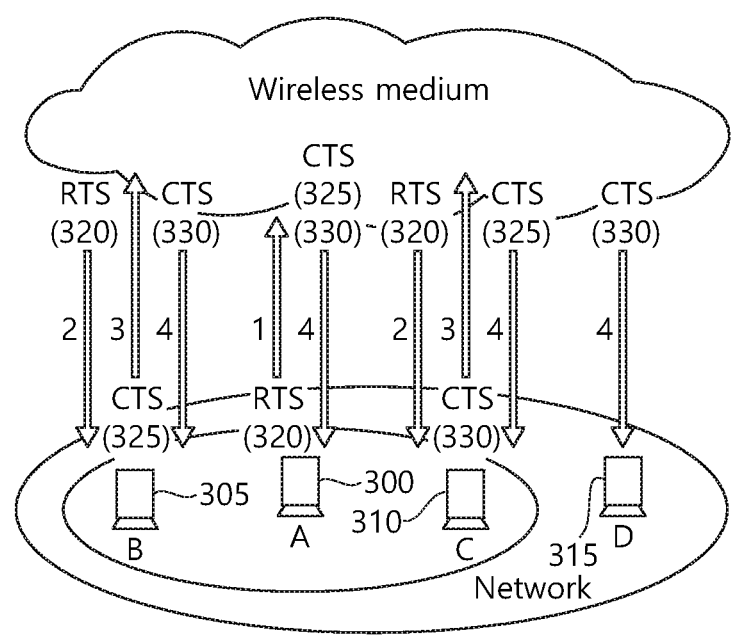
FIG. 11A and FIG. 11B is a conceptual diagram showing a CTS-to-self mechanism.
Figure 11B:
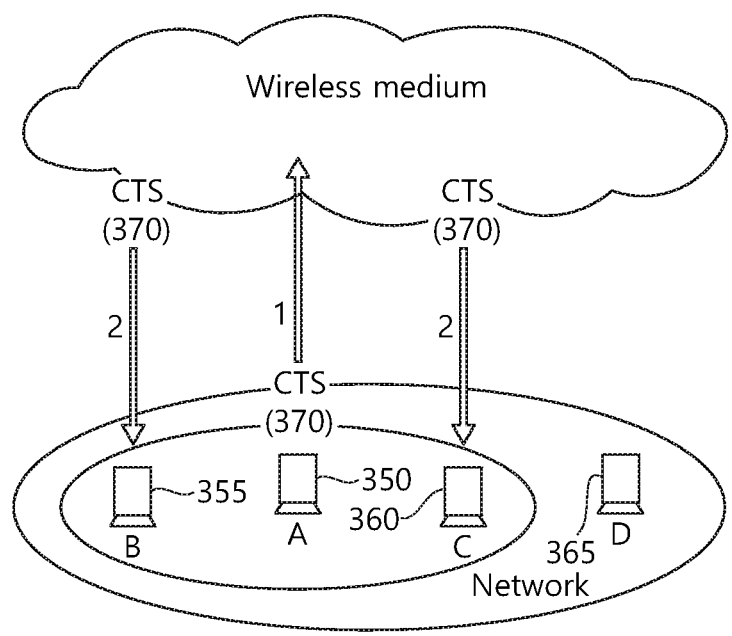

FIG. 11A and FIG. 11B is a conceptual diagram showing a CTS-to-self mechanism.

Referring to FIG. 11A and FIG. 11B, they show a comparison between a case (FIG. 11A) where the medium is sensed using an RTS frame and CTS frame exchange method and a case (FIG. 11B) where the medium using a CTS-to-self frame is sensed.

In the IEEE 802.11g standard, a CTS-to-self protection mechanism has been defined. The CTS-to-self protection mechanism may be used instead of the medium sensing mechanism using an RTS frame and a CTS frame. If the CTS-to-self protection mechanism is used, the overhead of the medium can be reduced as compared with the case where the medium sensing mechanism using RTS/CTS frames is used.

Referring to FIG. 11A, a method of exchanging an RTS frame and a CTS frame before a transmission STA transmits a data frame may be performed as follows.

In FIG. 11A, it is assumed that a STA A 300 attempts to transmit a data frame to a STA C 310.

1) First, the STAA 300 transmits an RTS frame 320.
2) The RTS frame 320 is received by a STA B 305 and the STA C 310 that are present in its carrier sensing range.
3) The STA B 305 and the STA C 310 transmit CTS frames 325 and 330.
4) The transmitted CTS frames 325 and 330 are transmitted to the STA A 300, the STAB 305, the STA C 310, and an STA D 315.

The STA D 315 has not received the RTS frame 320 from the STAA 300 because it is placed outside the carrier sensing range of the STAA 300 (i.e., the STA D 315 is a hidden node of the STA A 300). However, the STA D 315 may be aware that the STA A 300 has occupied the medium in order to transmit data by receiving the CTS frame 330 from the STA C 310. The STA D 315 may configure the NAV and may not access the medium.

5) The STAA 300 transmits the data frame to the STA C 310.

Referring to FIG. 11B, the medium sensing method using a CTS-to-self frame, performed before a transmission STA transmits a data frame, may be performed as follows. In FIG. 11B, it is assumed that an STAA 350 attempts to transmit a data frame to an STA C 360.

1) The STA A 350 transmits a CTS-to-self frame 370 to an STA B 355 and the STA C 360 that are present in its carrier sensing range.

2) The STA B 355 and the STA C 360 that have received the CTS-to-self frame defer the transmission of other data frames in order to receive a data frame from the STAA 350.

If such a method is used, an STA D 365 placed outside the coverage area of the STA A 350 does not receive a CTS frame 370 from the STAA 350. Accordingly, the STA D 365 may be not aware of whether or not data is transmitted by the STAA 350.

In such a case, a collision may occur between data frames when the STA D 365 transmits a data frame to the STAA 350 or the STA C 360. That is, the method using the CTS-to-self frame 370 cannot solve a hidden node issue. Accordingly, the method using the CTS-to-self frame 370 needs to be applied to only a case where the data transmission frames between STAs can be sensed, and in other cases, the medium needs to be sensed using the RTS/CTS frame exchange method.

An access point (AP) operating in a wireless local area network (WLAN) system may transmit data through the same time resource to each of a plurality of stations (STAs). If transmission from the AP to the STA is referred to as downlink transmission and transmission from the STA to the AP is referred to as uplink transmission, transmission of the AP may be expressed by a term as a DL MU transmission (or a downlink multi-user transmission).

In an existing WLAN system, an AP may perform DL MU transmission based on MU multiple input multiple output (MIMO), which may be referred to as DL MU MIMO transmission. In an embodiment of the present disclosure, the AP may perform DL MU transmission based on an orthogonal frequency division multiplexing access (OFDMA), which may be referred to as a term of DL MU OFDMA transmission. When DL MU OFDMA transmission is used, the AP may transmit a downlink frame to each of a plurality of STAs through each of a plurality of frequency resources (or sub-bands) on an overlapping time resource.

A PPDU, frame, and data transmitted through downlink transmission may be expressed to as a term of a downlink PPDU, a downlink frame and downlink data. A PPDU may be data unit including a PPDU header and a physical layer service data unit (PSDU) (or MPDU (MAC protocol data unit)). The PPDU header may include a PHY header and a PHY preamble, and the PSDU (or MPDU) may include or indicate a frame.

On the other hand, the transmission from an STA to an AP may be referred to as an uplink transmission. Transmission data from a plurality of STAs to the AP on the same time resource may be referred to as a term of an uplink multi-user (UL MU) transmission. Unlike in the existing WLAN system, the WLAN system in accordance with the embodiment of the present disclosure may be support UL MU transmission. A PPDU, frame, and data transmitted through uplink transmission may be referred to as a term of an uplink PPDU, an uplink frame, and uplink data, respectively. An uplink transmission by each of a plurality of STAs may be performed on a frequency domain or a spatial domain.

When the uplink transmission by each of a plurality of STAs is performed on the frequency domain, different frequency resources may be allocated based on OFDMA for the each of the plurality of STAs as uplink transmission resources. The each of the plurality of STAs may transmit an uplink frame to the AP through different allocated frequency resources. This transmission method using different frequency resources may be referred to as a term of UL MU OFDMA transmission method.

When the uplink transmission by the each of the plurality of STAs is performed on the spatial domain, different space time streams (or spatial streams) may be allocated for the each of the plurality of STAs. The each of the plurality of STAs may transmit an uplink frame to the AP through different space time streams. This transmission method using different spatial streams may be referred to as a term of UL MU MIMO transmission method.

Hereinafter, a disclosure of the present specification will be discussed in detail.

<The Disclosure of the Present Specification>

A term of base station used hereinafter, is used as a comprehensive terminology including a remote radio head (RRH), an eNB (eNodeB), a transmission point (TP), a reception point (RP), a relay and so on. Hereinafter, a proposed method hereinafter will be explained based on a 3GPP LTE system for the purpose of explanation. However, a scope to which the proposed method will be applied may be extendable to other systems, in addition to the 3GPP LTE system.

Figure 12:
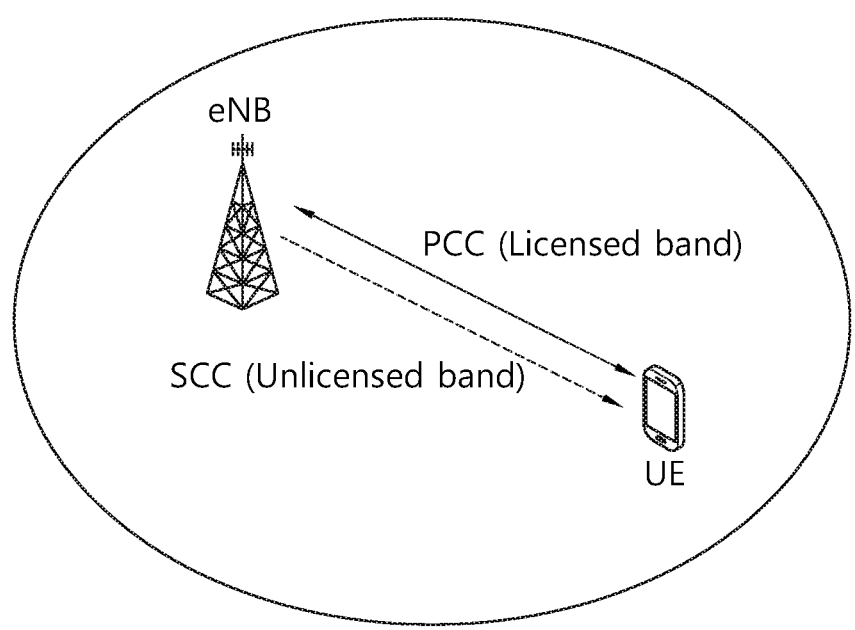
FIG. 12 shows an example of a wireless communication system of using both a licensed band and an unlicensed band.

FIG. 12 Shows an Example of a Wireless Communication System of Using Both a Licensed Band and an Unlicensed Band.

Referring to FIG. 12, in order to transmit or receive a signal through a carrier of the unlicensed band in which an exclusive use by a specific system is not guaranteed, technologies described in the present specification may allow for the base station to transmit a signal to the UE or for the UE to transmit a signal to the base station in a carrier aggregation case of both the licensed band (e.g. LTE or LTE-A band) and the unlicensed band as shown in FIG. 12.

Hereinafter, for the purpose of explanation of the proposed method, it has been assumed as a case that the UE is configured to perform a wireless communication through two component carriers (CCs) in the licensed band and the unlicensed band, respectively.

Herein, as an example, the carrier of the licensed band may be interpreted as a primary CC (referred to as PCC or PCell), while the carrier of the unlicensed band may be interpreted as a secondary CC (referred to as SCC or SCell).

However, the proposed methods and solutions in the disclosure of the present specification may be applicable to be extended to the case that a plurality of licensed band and a plurality of unlicensed bands are utilized in a carrier aggregation scheme, further applicable to the case that a transmission and reception of signal is made between the base station and the UE only with the unlicensed band.

Further, the proposed methods and solutions in the disclosure of the present specification may be not only applicable to 3GPP LTE system but also applicable to be extended through other featured system.

As an example of an operation in the unlicensed band operated in a contention based random access method, the base station may firstly perform a Carrier Sensing (CS), before transmitting and receiving data.

Further, the base station checks whether the current channel state of the SCell operated in the unlicensed band is busy or idle, and it may transmit a scheduling grant through a (E)PDCCH of the PCell (e.g. Cross Carrier Scheduling (CSS)) or a PDCCH of the SCell, and may attempt to transmit and receive data, if the current channel state is determined as idle.

In the present specification for the purpose of explanation, it may be explained by explicating a base station and terminal of LTE/LTE-A system as a base station and UE, and a base station and terminal of WLAN system as an AP and a STA.

Though there are various systems used in the unlicensed band, it is an IEEE802.11 WLAN system that will give the most substantial influence especially in the LTE-A system and will be given the most substantial influence if the LTE-A system is used in the unlicensed band.

The basic operation method of WLAN system sets forth as premise on the carrier sensing of Carrier Sense Medium Access (CSMA)/Collision Avoidance (CA).

This method of carrier sensing is mandatory to all STAs including an AP in WLAN system.

Figure 13:
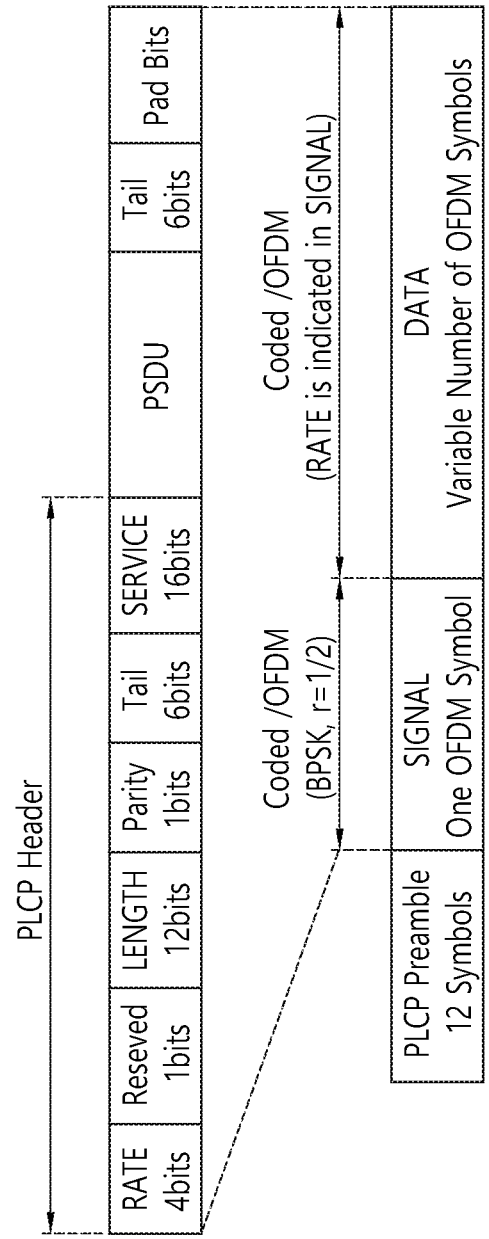
FIG. 13 shows an example a PPDU frame format in WLAN.

FIG. 13 Shows an Example a PPDU Frame Format in WLAN.

Referring to FIG. 13, the PPDU, a physical layer frame in WLAN may be configured for a Physical Layer Convergence Procedure (PLCP), a preamble, a signal field, and data.

More specifically, the PLCP preamble is preceded, and then the signal field is transmitted and then the data is transmitted.

The preamble is transmitted for the purpose of adjusting frequency and synchronization, and the later-transmitted signal (hereinafter, referred to as SIG) field indicates a rate and a data transmission length of the later-transmitted data.

The SIG field is transmitted using the most powerful (lower coding rate) coding so that the largest number of STAs can accurately receive the SIG field.

Figure 14:
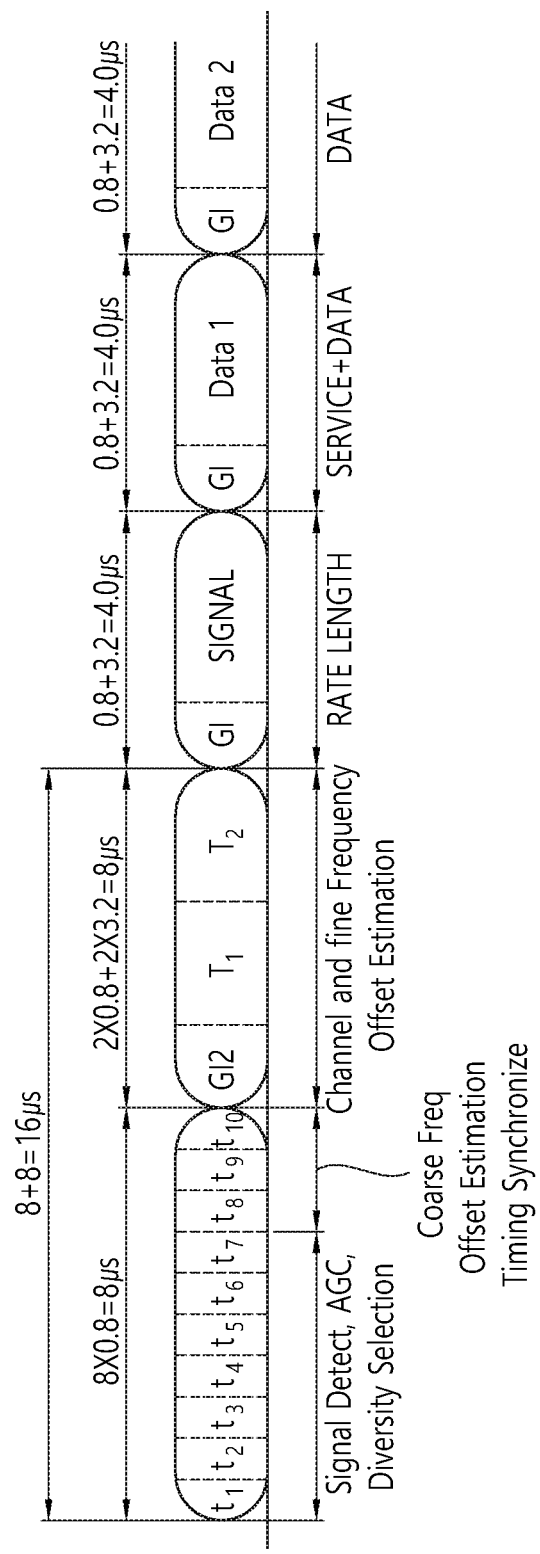
FIG. 14 shows an example of the PLCP preamble.

FIG. 14 Shows an Example of the PLCP Preamble.

Referring to FIG. 14, it is configured for ten short symbols (STF) and two long symbols (LTF), in which a length of each symbol is 0.8 us when a channel bandwidth is 20 MHz. Accordingly, the STF having a length of Bus and the LTF having a length of Bus configures the PLCP preamble of 16 us.

The STF and the LTF is designed for different purposes, and the STF is for signal detection, and an adjustment of a coarse frequency offset and time synchronization, while the LTF is for more accurate frequency offset and channel estimation.

The SIG field is positioned subsequent to the PLCP preamble. Timing values shown in FIG. 14 are values which correspond to when a channel bandwidth is 20 MHz, it will be twice when the channel bandwidth is decreased to 10 MHz, and it will be four times when the channel bandwidth is decreased to 5 MHz.

A process is started when a node wishing to transmit data transmits a Request To Send (RTS) frame in WLAN. A destination node responds to the signal by transmitting a Clear To Send (CTS) frame, in a wireless environment when there are no other signals of being transmitting and receiving and thus the transmission is available.

All other nodes receiving the RTS frame or the CTS frame is prevented from transmitting data for a determined time. Information on a time when the transmission is prevented is transmitted, included in the RTS frame or the CTS frame. This protocol set forth a premise that all nodes have the same transmission range.

RTS/CTS is an additional and selective method for implementing a Carrier Sense Multiple Access with Collision Avoidance (CSMA/CA) virtual carrier sensing.

Since only a physical carrier sensing is used in the basic 802.11 (WLAN) standard, a hidden node or terminal problem may be issued.

A RTS/CTS packet size limit value is configured to a node, when a RTS/CTS mechanism is used.

The RTS/CTS packet size limit value has values between 0 to 2347 octets. In general, if a size of packet is less than the RTS/CTS packet size, then the RTS/CTS frame is not transmitted. That is, a RTS/CTS exchange is started only if the size of packet to be transmitted is greater than the limit value. In other cases, data frame is immediately transmitted. Expected time for requiring transmitting data is written in the RTS/CTS packet, and a node which is not related to transmit, will be in a holding state without transmitting for the expected time.

Thus, the disclosures of the present specification proposes a scheme to occupy using the medium, by transmitting a WLAN signal (e.g. RTS, CTS, preamble (L-SIG)) so that a LTE system operated in the unlicensed band can coexist with a WLAN system.

However, it can be assumed that a transmission is performed only if the medium is idle because a carrier sensing is firstly performed in a process that a base station (eNodeB) and the UE transmits all signals.

More specifically, a first disclosure of the disclosures of the present specification proposes solutions of transmitting and receiving a signal (Reservation signal) to occupy or reserve the medium, a second disclosure proposes solutions of transmitting a RTS/CTS indication through the licensed band, a third disclosure proposes solutions of transmitting data from a plurality of UEs, and a fourth disclosure discuss a RTS/CTS packet structure capable of using in the disclosure of the present specification.

I. The First Disclosure of the Present Invention

As mentioned above, the first disclosure of the disclosures of the present invention proposes solutions of transmitting and receiving a signal (Reservation signal) to occupy or reserve the medium.

The terminal may receive, through the unlicensed band, the data frame in a stable and efficient manner, in accordance with a method of occupying and reserving based on the first disclosure.

That is, the terminal may, at a specific frame or a specific subframe, receive, through the unlicensed band, the data channel in a stable and efficient manner, in accordance with the method of occupying and reserving based on the first disclosure.

Herein, the data frame, the specific frame, or the specific subframe, may be a frame or a subframe used in a mobile communication system by which is operated on the licensed band.

For example, wherein the mobile communication system is a LTE (Long Term Evolution) or a LTE-A (Long Term Evolution-Advanced) system.

However, the mobile communication system which the disclosed technology of the present specification may be applicable is not limited thereto, and a general meaning of concept including a various type of mobile communication which was developed in the past or will be developed in the future. For example, the mobile communication system may be a mobile communication system in accordance with an existing third generation mobile communication standard (3GPP) or a next-generation mobile communication standard (e.g. fifth generation mobile communications: 5G).

Hereinafter, for the purpose of explanation, the data frame, the specific frame, or the specific subframe may be used together with a term of a LTE frame.

A method of transmitting and receiving a signal to occupy the medium may be as follows, in accordance with the first disclosure of the present specification.

1. A First Method: RTS by eNodeB, CTS by UE

The method to occupy the medium, in accordance with the first method, is a method which a base station transmits the RTS frame, and the a UE transmits the CTS frame.

Figure 15:
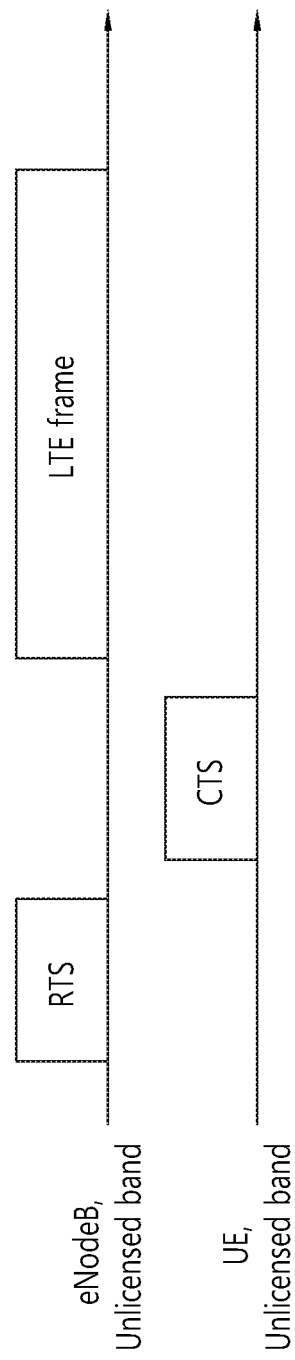
FIGS. 15-16 are an exemplary diagram showing a method to occupy a medium, in accordance with the first method of the first disclosure of the present specification.
Figure 16:
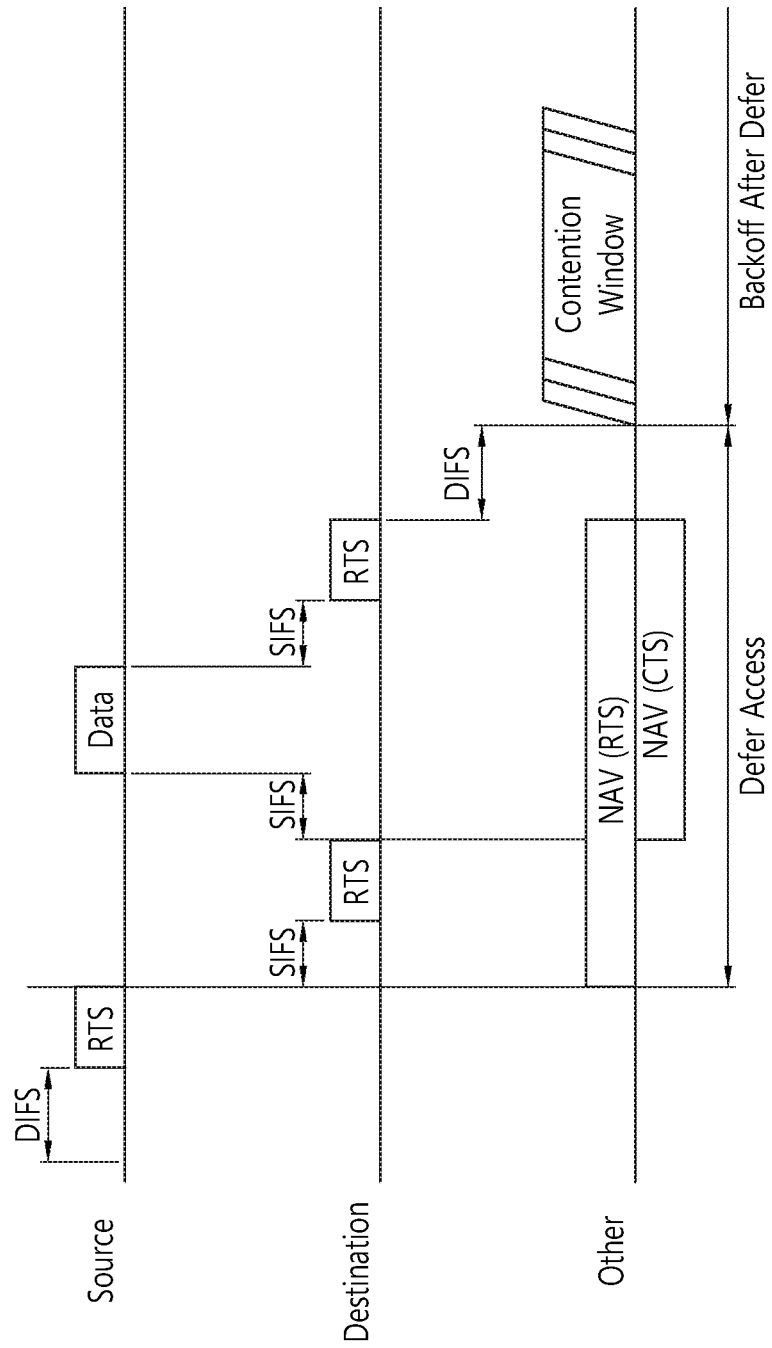

FIGS. 15-16 are an Exemplary Diagram Showing a Method to Occupy the Medium, in Accordance with the First Method of the First Disclosure of the Present Specification.

Referring to FIG. 15, the most general method capable of occupying the medium, to transmit downlink data to the base station and the UE in the unlicensed band, is to allow for the base station supposed to transmit data to transmit a RTS frame (hereinafter, RTS), and then for the UE supposed to receive data to transmit a CTS frame (hereinafter, CTS), and then for the base station to transmit, through the unlicensed band to the UE, the LTE frame which is a data frame appropriate for a mobile communication standard.

In this case, STAs having received the RTS, the CTS, and the data packet perform setting a Network Allocation Vector (NAV) using information of a duration field included in the RTS, the CTS, the data packet. The STA to which the NAV is set determines that the medium will be busy for a corresponding NAV duration, and does not perform transmitting data.

2. A Second Method: RTS by eNodeB, CTS by eNodeB

The method to occupy the medium in accordance with the second method is a method in which a base station transmits the RTS frame and the CTS frame.

Figure 17:
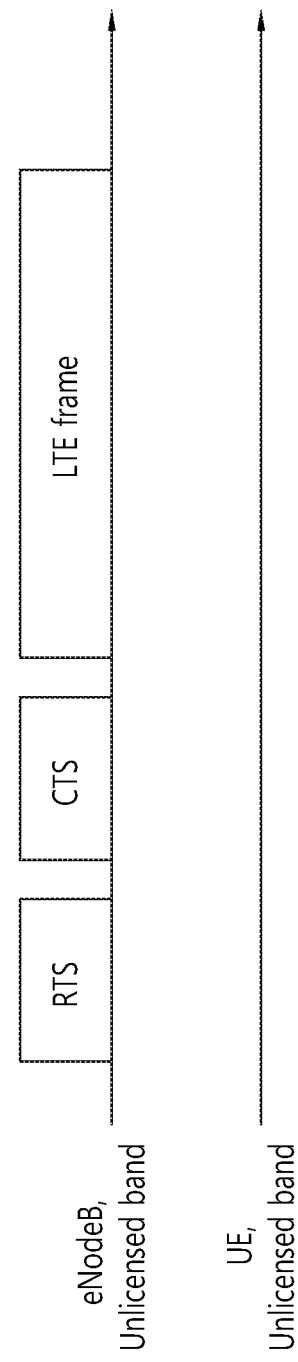
FIG. 17 is an exemplary diagram showing a method to occupy the medium, in accordance with the second method of the first disclosure of the present specification.

FIG. 17 is an Exemplary Diagram Showing a Method to Occupy the Medium, in Accordance with the Second Method of the First Disclosure of the Present Specification.

Referring to FIG. 17, another method capable of occupying the medium, to transmit downlink data to the base station and the UE in the unlicensed band, is to allow for the base station supposed to transmit data to transmit the RTS frame, and then to transmit the CTS frame.

The base station having transmitted the CTS, transmit the LTE frame to the UE. This may become a scheme to solve a problem that the UE should be able to generate and transmit a WLAN signal.

Specifically, in order to reduce a hidden node problem, a base station which transmits the RTS and a base station which transmits the CTS may be different from each other. For example, if a base station (e.g. eNodeB A) which will transmit the data, send the RTS to the UE, then another base station (e.g. eNodeB B) surrounding the UE (which receives the RTS), may transmit the CTS, instead of the UE.

And then, the eNodeB A (having received the CTS transmitted by the eNodeB B) transmit the LTE frame to the UE. In this case, specifically, a plurality of base station (TP) may transmit, at the same timing, the CTS configured for the same sequence. To this end, in order to determine in advance the base station (TP) which will transmit the CTS, there will be some rules in advance among base stations. In this case, the merits are occurred in that more STAs may perform a NAV setting, as a signal arrival region of the CTS becomes wider.

3. A Third Method: CTS/CTS-to-Self by eNodeB

A method to occupy the medium in accordance with the third method is a method in which the base station transmits the CTS/CTS-to-self frame (hereinafter, CTS/CTS-to-self).

In a WLAN system, existed is a CTS-to-self mechanism, which is a scheme that the STA attempting to transmit data, directly transmits the CTS, by set ting itself as a receiver, and then transmits the data packet.

In this case, a process of the RTS transmission—the CTS transmission—the data packet (or frame) transmission may be simplified as the CTS-to-self transmission—the data packet transmission. However, in this case, the hidden node problem may be occurred in that STAs adjacent to the STA which will receive the data packet uses the medium without hearing the CTS and the data packet.

In order to transmit the downlink data to the base station and the UE in the unlicensed band, the scheme may be considered in that the base station which will transmit data without transmitting the RTS frame, immediately transmits the CTS or the CTS-to-self, and then transmits the LTE frame to the UE.

4. A Fourth Method: CTS/CTS-to-Self by UE

A method to occupy the medium in accordance with the fourth method is a method in which the UE transmits the CTS/CTS-to-self.

Specifically, according to the fourth method, the UE using both the licensed band and the unlicensed band for communicating with a mobile communication base station, may transmit, through the unlicensed band, the Clear To Send (CTS) frame defined by a WLAN (Wireless Local Area Network), before receiving the data channel from the mobile communication base station, and may, at a specific frame or a specific subframe, receive, through the unlicensed band and from the mobile communication base station, a data channel, after transmitting the CTS frame.

In the present specification, a term of the specific frame or the specific subframe may be used together with a term of the data frame and the LTE frame for the purpose of explanation.

Herein, the specific frame or a specific subframe by which the data channel is received, may be a frame or a subframe used in a mobile communication system by which is operated on the licensed band.

For example, the mobile communication system may be a LTE (Long Term Evolution) or a LTE-A (Long Term Evolution-Advanced) system.

Further, the UE may receive, through the unlicensed band and from the base station, the CTS request or the CTS request indication to request of transmitting the CTS frame.

The CTS request or the CTS request indication may be transmitted through a PDCCH (Physical Downlink Control Channel) or a higher layer signaling.

Figure 18:
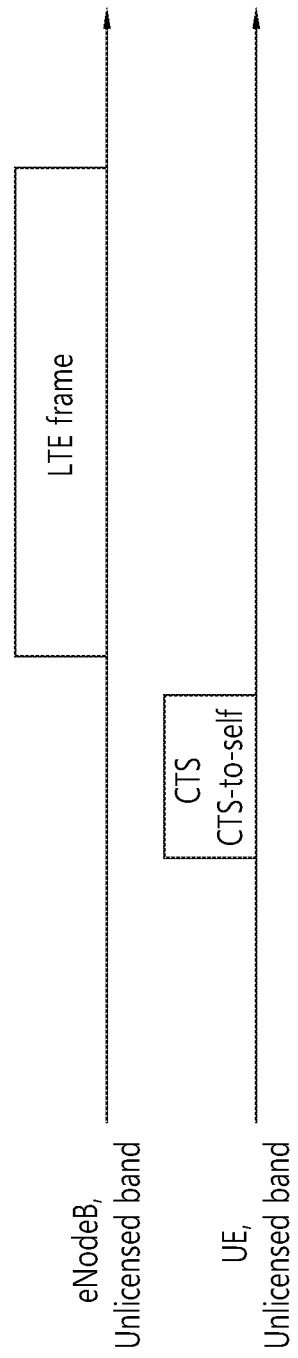
FIG. 18 is an exemplary diagram showing a method to occupy the medium, in accordance with the fourth method of the first disclosure of the present specification.

FIG. 18 is an Exemplary Diagram Showing a Method to Occupy the Medium, in Accordance with the Fourth Method of the First Disclosure of the Present Specification.

Referring to FIG. 18, an interference environment around the UE which actually receives data may be more important than interference around the base station.

Accordingly, it may be more important to prevent the surrounding STAs from transmitting a packet than to prevent STAs surrounding the base station from transmitting a packet, in order for the UE to receive data.

To this end, contrary to the above-mentioned third method, in order to transmit the downlink data to the base station and the UE in the unlicensed band, a scheme may be considered in that the UE transmits the CTS or the CTS-to-self, and then the base station transmit the LTE frame to the UE, as shown in FIG. 18.

In this case, specifically, if there is data which the base station transmit to the UE, the base station may transmit, through a PDCCH (Physical Downlink Control Channel) or a higher layer signaling, a CTS request (or a CTS request indication) of an indication to request of transmitting, through the licensed band (PCell) to the UE, the CTS/CTS-to-self. Specifically, the base station may transmit, to the UE, a downlink grant as an indication that the UE should transmit the CTS/CTS-to-self, before transmitting an actual downlink data.

5. A Fifth Method: CTS/CTS-to-Self by eNodeB, CTS/CTS-to-Self by UE

The method to occupy the medium in accordance with the fifth method is a method in which the base station and the UE transmit CTS/CTS-to-self, respectively.

The first method among the above-mentioned methods will be the best method to solve the hidden node issue. However, in this case, for STAs which receives only the RTS frame and does not receive all of the CTS frame and the data packet (or frame) within a certain time, they will terminate a NAV prepared in configured through receiving the RTS frame In this case, WLAN STAs would not be able to interpret the LTE frame, and thus some STAs having received the RTS frame and then has not received the CTS frame, determine that they do not receive the data packet and they will cancel the NAV setting, unless the LTE frame is transmitted, by including the PLCP preamble and the SIGNAL field of the WLAN packet. In this case, occurred may be the situation that STAs performs a packet transmission while the LTE frame is being transmitted.

Figure 19:
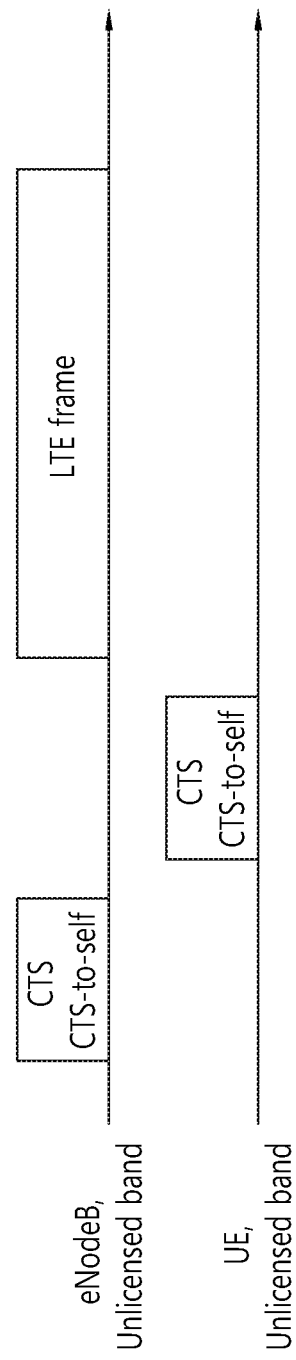
FIG. 19 is an exemplary diagram showing a method to occupy the medium, in accordance with the fifth method of the first disclosure of the present invention.

FIG. 19 is an Exemplary Diagram Showing a Method to Occupy the Medium, in Accordance with the Fifth Method of the First Disclosure of the Present Invention.

Referring to FIG. 19, the fifth method proposes a scheme of transmitting the CTS/CTS-to-self in order for both the base station and the UE to occupy the medium.

In this case, the base station firstly transmits the CTS/CTS-to-self, instead of the RTS frame, and then the UE transmits the CTS/CTS-to-self, and then the base station may transmit the LTE frame. Or, on the other hand, if the UE firstly transmit the CTS/CTS-to-self, then the base station may transmit the CTS/CTS-to-self, and then transmit the LTE frame.

According to the fifth method, all STAs receiving the CTS/CTS-to-self which the base station has transmitted, or the CTS/CTS-to-self which the UE has transmitted, would be able to set the NAV for the duration indicated in the CTS/CTS-to-self, and thus the problem that the NAV would be cancelled as the STAs do not interpret the LTE frame, would be able to be solved.

6. A Sixth Method: Preamble Transmission by eNodeB/UE

A method to occupy the medium in accordance with the sixth method, is a method of transmitting a preamble in order for the base station/UE to occupy the medium.

Figure 20:
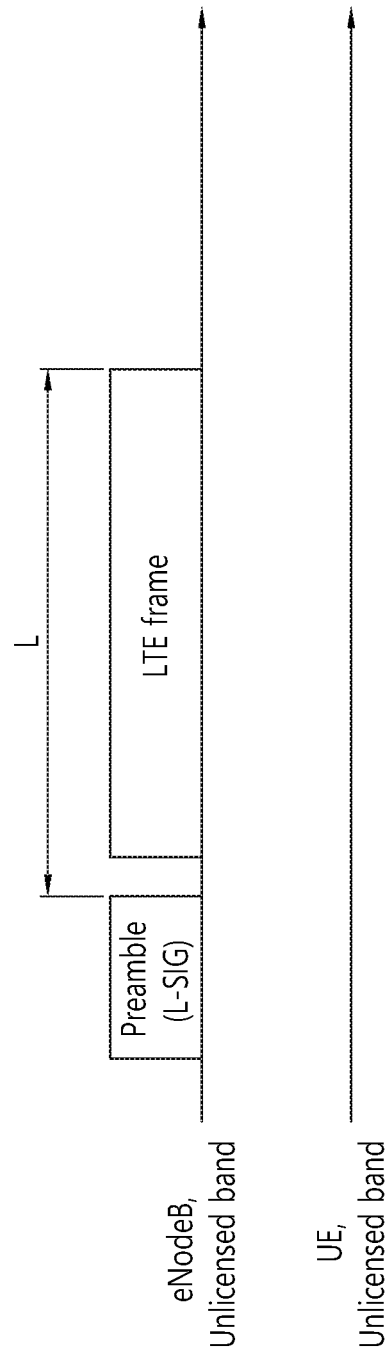
FIGS. 20-21 is an exemplary diagram showing a method to occupy the medium, in accordance with the sixth method of the first disclosure of the present specification.
Figure 21:
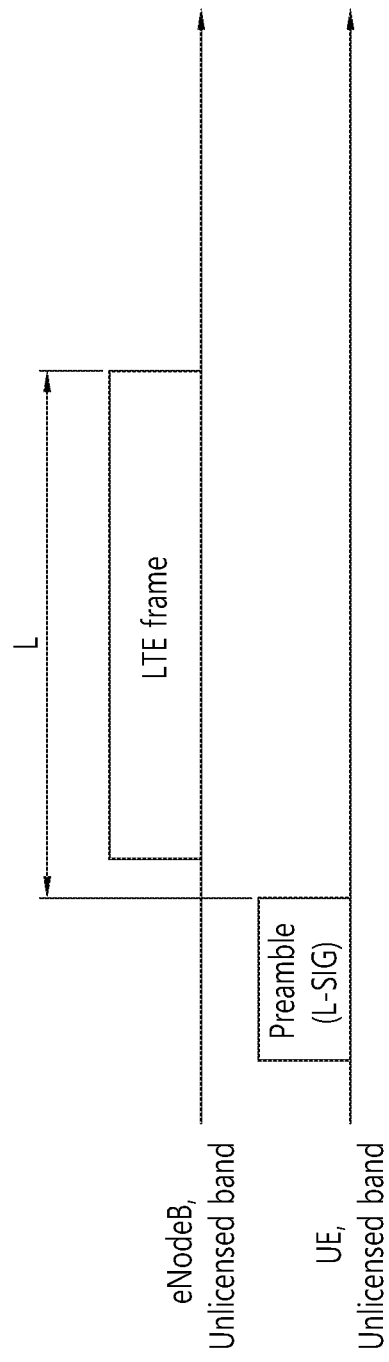

FIGS. 20-21 is an Exemplary Diagram Showing a Method to Occupy the Medium, in Accordance with the Sixth Method of the First Disclosure of the Present Specification.

Referring to FIG. 20, the sixth method proposes a method of transmitting the PLCP preamble and a signal field of the WLAN, before transmitting the LTE frame so that surrounding STAs can not transmit a packet while the base station transmit a packet.

Hereinafter, for the purpose of explanation, a combination of the PLCP preamble (e.g. STF and LTF) the signal field may be explained, by referring to as the preamble.

In a length field included in the signal field, a value corresponding to a length of a data field shown in FIG. 13 would be transmitted.

Thus, STAs receiving the L-SIG field, in general, determines that packets have been transmitted by a length indicated in the length field included in the signal field of the preamble (e.g. L-SIG field), and do not perform a packet transmission, since a packet reception operation has been performed for the corresponding duration.

Accordingly, for example, in order for the base station to transmit data to the UE (if the medium is determined to be an idle state), the base station transmit a packet configured only for the PLCP preamble (e.g STF and LTF) and a signal field, and then may transmit the LTE frame as shown in FIG. 20.

In this case, in a length field included in the signal field, the sixth method specifically proposes to include a value corresponding to a length corresponding to the timing from when a transmission of the signal field is finished to when the LTE frame is finished, or a length corresponding to a later timing than the timing. That is, the length field may indicate a value by corresponding to a length of the duration of L shown in FIG. 20.

Further, referring to FIG. 21, in order for the base station to transmit data to the UE (if the medium is determined to be an idle state), the sixth method proposes a method that the UE transmit a packet configured only for thesreamble and then the base station transmit the LTE frame.

In this case, in a length field included in the signal field, the sixth method specifically proposes to include a value corresponding to a length corresponding to the timing from when a transmission of the signal field is finished to when the LTE frame is finished, or a length corresponding to a later timing than the timing. That is, the length field may indicate a value by corresponding to a length of the duration of L shown in FIG. 21.

In this case, specifically, if the base station has data to be transmitted to the UE, then the base station may transmit, through a PDCCH or a higher layer signaling, an indication to transmit, through the licensed band (PCell) to the UE, a packet configured only for the preamble.

Especially, the base station may transmit to the UE the downlink grant as an indication in order for the UE to transmit the packet only for the preamble, before transmitting an actual downlink data.

II. A Second Disclosure of the Present Specification

As mentioned above, the second disclosure of the present specification proposes a method of transmitting of a RTS/CTS indication through the licensed band.

In specific, considering a LTE system and WLAN system of which a subcarrier spacing and a sampling rate etc. are different from each other, it may be a difficult problem to have the UE transmit and receive a WLAN signal as well in implementing the terminal in actual.

In this case, transmitting the WLAN signal by the UE is regarded as more necessary than receiving it by the UE so that the UE can occupy the medium of the unlicensed band by performing the NAV setting by surrounding STAs.

Thus, when considering difficulties of performing both transmitting and receiving the WLAN signal by the UE (or the eNodeB), though a reception is not performed, considered may be the environment that only at least a transmission of the WLAN signal is available.

In this case, when the method is used to occupy the medium between the base station and the UE, which has been considered in the first disclosure of the present specification, the base station and the UE do not receive or analyze the WLAN packet (packet etc. only consisting of RTS, CTS, CTS-to-self, and preamble) transmitted from each other.

Considering this case, the second disclosure of the present specification proposes informing, through the licensed band as follows, the UE (or the base station) that the base station (or the UE) has transmitted the WLAN packet (RTS, CTS, CTS-to-self, and preamble packet).

1. Transmission of RTS Indication or CTS Request

As mentioned above, the second disclosure of the present specification proposes transmitting the RTS by the base station in order to transmit data to the UE, and then transmitting, through the licensed band to the UE, RTS indication (or CTS request) information for the UE which would not receive the RTS.

In this case, specifically, a transmission of the RTS indication (or CTS request) is done through a PDCCH (DL grant), or a higher layer signaling.

The UE which receives the RTS indication (or CTS request) (may be aware that the base station has transmitted the RTS thereto and) may transmit the CTS (or CTS-to-self). In this case, specifically in the CTS (or CTS-to-self), the following information may be included.

a-1) information on a timing at which the CTS is to be transmitted b-1) a value of duration to include in a duration field of the CTS or a value to indicate the specific duration value c-1) information on a timing at which a data transmission (LTE frame) is started d-1) information on a duration (e.g., subframe number) during which the data transmission (LTE frame) is to be progressed When the UE having received the RTS indication (or CTS request) transmits the CTS (CTS-to-self), may configure the duration field of the CTS (CTS-to-self) using 'information on duration to include in the CTS (CTS-to-self)' included in the RTS indication (or CTS request) information.

Further, as to a transmission timing of the CTS (CTS-to-self), the CTS transmission timing of the UE may be determined using 'information on a timing at which the CTS is to be transmitted' included in the RTS indication (or CTS request).

The UE having transmitted the CTS (CTS-to-self) attempt to receive a data frame using information on the data transmission start timing and information on the transmission duration included in the RTS indication (or CTS request).

In this case, the UE which does not actually receive the RTS but receives, the licensed band (PCell), that the base station has transmitted the RTS, may not transmit the CTS to be matched to a SIFS duration, after the transmission of the RTS is finished, but may be available to transmit the CTS after a long lapse of time.

In this case, after the UE determines that the channel is idle based on a channel sensing, it should transmit the CTS, and it may not transmit the CTS persistently as the channel is continue to be busy, in some cases. Accordingly, the following method may be used in order for the base station having transmitted the RTS to avoid waiting for the CTS transmission by the UE for a long duration 2-1 Method (a First One of a Plurality of Second Methods)

According to 2-1 method, when defined as T is a value on a timing at which a data transmission (LTE frame) is started, which is included in the RTS indication (or CTS request), the CTS transmission may not be performed unless the CTS transmission is finished before a corresponding timing or a timing corresponding to 'the corresponding timing−α.'

That UE may additionally inform, through the license band (PCell), of the base station that the CTS transmission has been failed.

2-2 Method (a Second One of a Plurality of Second Methods)

According to 2-2 method, information corresponding to 'a value of effective duration for the CTS transmission' may be additionally included in the RTS indication (or CTS request).

In this case, the UE may not perform the CTS transmission unless the CTS transmission is started (or finished) in the effective duration for the CTS transmission received through the RTS indication (or CTS request), as the channel continues to be busy. That UE may additionally inform, through the licensed band (PCell), of the base station that the CTS transmission has been failed.

In this case, specifically the information on the value of the effective duration for the CTS transmission may be include in the RTS indication (or CTS request), but it may be configured, thorough an additional higher layer signaling or a SIB, to the UE.

That RTS indication (or CTS request) may be transmitted to request that the UE transmits the CTS (CTS-to-self), though the base station does not transmit the RTS.

2. CTS Transmission Indication

Further, the second disclosure of the present specification proposes transmitting, through the license band (PCell) to the UE, the CTS indication (information) for the UE which would not receive the CTS/CTS-to-self, after the base station (or UE) has transmitted the CTS/CTS-to-self.

In this case, specifically the transmission of the CTS indication is done through a PDCCH (DL grant) and a higher layer signaling when the base station has transmitted it, whereas it may be done through a PUCCH or the higher layer signaling when the UE has transmitted it.

If the UE receives the CTS (CTS-to-self) indication, then the UE may aware that the base station has transmitted the CTS (CTS-to-self) thereto, and may attempt to receive data.

In this case, specifically information on the CTS (CTS-to-self) indication transmitted by the base station may include the following information.

a-2) information on a timing at which a data transmission (LTE frame) is started b-2) information on a duration (e.g. subframe number) during which the data transmission (LTE frame) is to be progressed When the UE having received the CTS (CTS-to-self) indication receives data, a reception of data may be progressed based on the information on the transmission start time and the transmission duration of the data (LTE frame) included in the CTS (CTS-to-self) indication.

On the other hand, if the base station receives the CTS (CTS-to-self) indication from the UE, then the base station may aware that the UE has transmitted the CTS (CTS-to-self), and then may transmit data.

In this case, specifically in the CTS (CTS-to-self) indication information transmitted by the UE, the following information may be included.

a-3) information on a timing at which a data transmission (LTE frame) is started b-3) information on a duration (e.g. subframe number) during which the data transmission (LTE frame) is to be progressed When the base station having received the CTS (CTS-to-self) indication transmits data, a data transmission may be progressed based on the information on the transmission start time and the transmission duration of the data (LTE frame) included in the CTS (CTS-to-self) indication.

In this case, the base station which does not actually receive the CTS but receives, through the licensed band, that the UE has transmitted the CTS (CTS-to-self), may not transmit a data packet to be matched to a SIFS duration after the CTS transmission (CTS-to-self) is finished, but may be available to transmit the data packet after a long lapse of time.

In this case, after the base station determines that the channel is idle based on a channel sensing, and it should transmit the data packet, and it may not transmit the data packet persistently as the channel is continue to be busy, in some cases.

Thus, the following method may be used in order for the UE having transmitted the CTS (CTS-to-self) to avoid waiting for the data packet transmission by the base station for a long duration.

2-A Method

According to 2-A method, when defined as T is a value on a timing at which a data transmission (LTE frame) may be started, which is included in the RTS indication (or CTS request), the data transmission packet may not be performed unless the data transmission packet may be started before a corresponding timing or a timing corresponding to 'the corresponding timing+α.'

That base station may additionally inform, through the license band (PCell), the UE that the data transmission has been failed.

2-B Method

According to 2-B method, when defined as T is a value on a timing at which a data transmission (LTE frame) is started, which is included in the CTS (CTS-to-self) indication, the data transmission packet may not be performed, unless the data transmission packet is started before a corresponding timing or a timing corresponding to 'the corresponding timing+α.'

That base station may additionally inform, through the license band (PCell), the UE that the data transmission has been failed.

2-C Method

According to 2-C method, the base station may not perform the CTS transmission, unless the data transmission packet may start (or finish) in the duration which is set through the duration field of the RTS or the CTS, as the channel continues to be busy.

That base station may additionally inform, through the license band (PCell), of the UE that the data transmission has been failed.

2-D Method

According to 2-C method, in the CTS (CTS-to-self) indication, information corresponding to 'the value of effective duration for the data transmission' may be included.

In this case, the base station may not perform the data transmission, unless the data transmission is started (or finished) in the effective duration for the data transmission received through the CTS (CTS-to-self) indication, as the channel continues to be busy.

That base station may additionally inform, through the license band (PCell), the UE that the data transmission has been failed. In this case, specifically the information on the value of the effective duration for the data transmission may be include in the CTS (CTS-to-self) indication, but it may be set, thorough an additional higher layer signaling or a SIB, to the UE.

3. Explanation on Examples on a Method to Transmit the RTS Indication (or CTS Request) and the CTS Indication Hereinafter, the above-mentioned method to transmit the RTS indication (or CTS request) and the CTS indication, is explained by specific examples.

Figure 22:
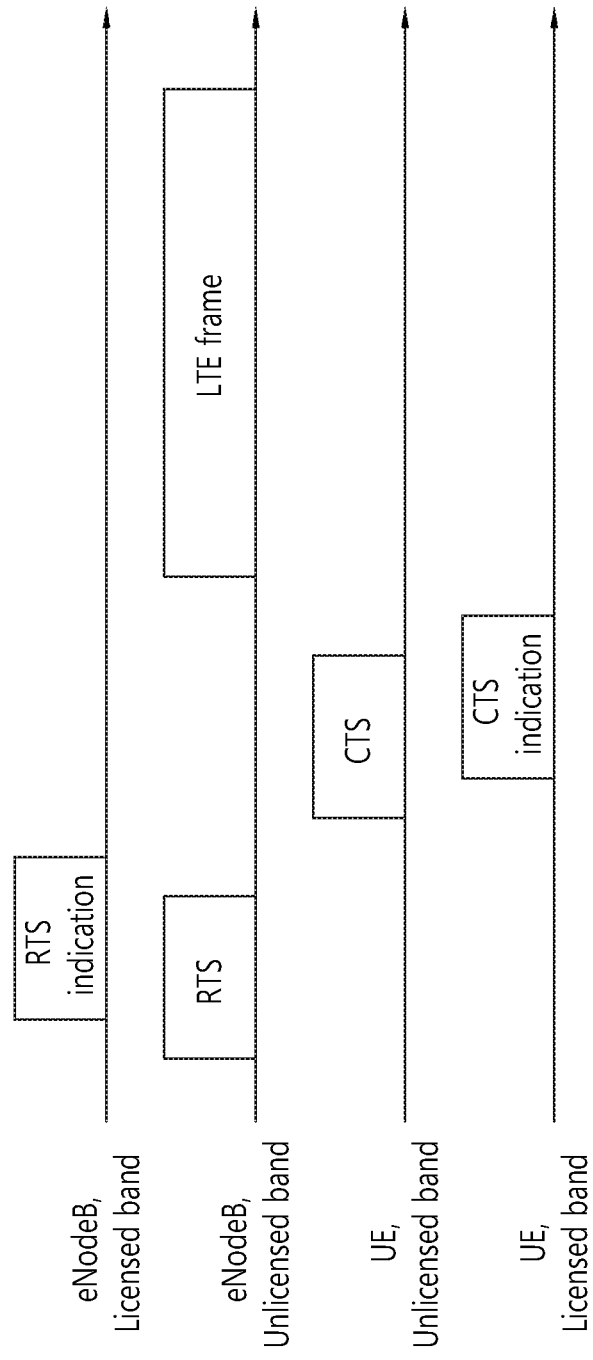
FIG. 22 shows an example of method to transmit the RTS indication and the CTS indication related to the first method of the first disclosure of the present specification.

FIG. 22 Shows an Example of Method to Transmit the RTS Indication and the CTS Indication Related to the First Method of the First Disclosure of the Present Specification.

Referring to FIG. 22, in the method of occupying the medium such as the first method of the first disclosure of the present specification, the base station may transmit, through the licensed band (PCell) to the UE, the RTS indication (or CTS request) for the UE which would not receive the RTS, after transmitting (together with transmitting) the RTS, in order for the base station to transmit data to the UE.

That UE having received it may transmit the CTS by utilizing information included in the RTS indication (or CTS request).

In addition, the UE may transmit, through the licensed band (PCell), the CTS indication for the base station which would not receive the CTS.

And then, the base station may transmit the LTE frame to the UE at a timing reserved through the RTS indication (or CTS request) and/or the CTS indication.

Figure 23:
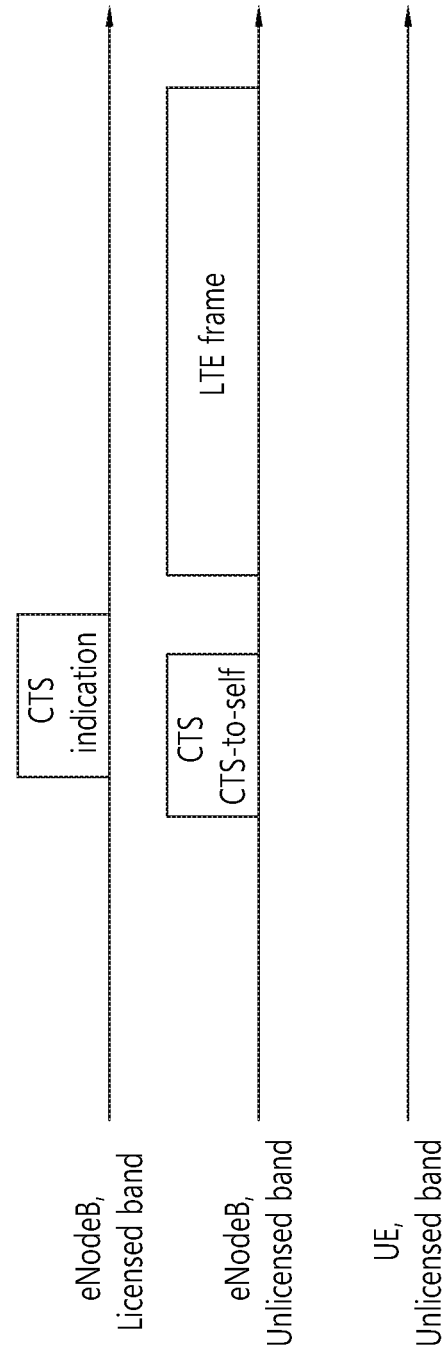
FIG. 23 shows an example of method to transmit the CTS (CTS-to-self) indication related to the third method of the first disclosure of the present specification.

FIG. 23 Shows an Example of Method to Transmit the CTS (CTS-to-Self) Indication Related to the Third Method of the First Disclosure of the Present Specification.

Referring to FIG. 23, in the method of occupying the medium such as the third method of the first disclosure of the present specification, the base station may transmit, through the licensed band (PCell) to the UE, the CTS (CTS-to-self) indication for the UE which would not receive the CTS/CTS-to-self, after transmitting (together with transmitting) the CTS/CTS-to-self in order for the base station to transmit data to the UE. That UE having received it may receive the data (LTE frame) by utilizing information included in the CTS (CTS-to-self) indication.

Figure 24:
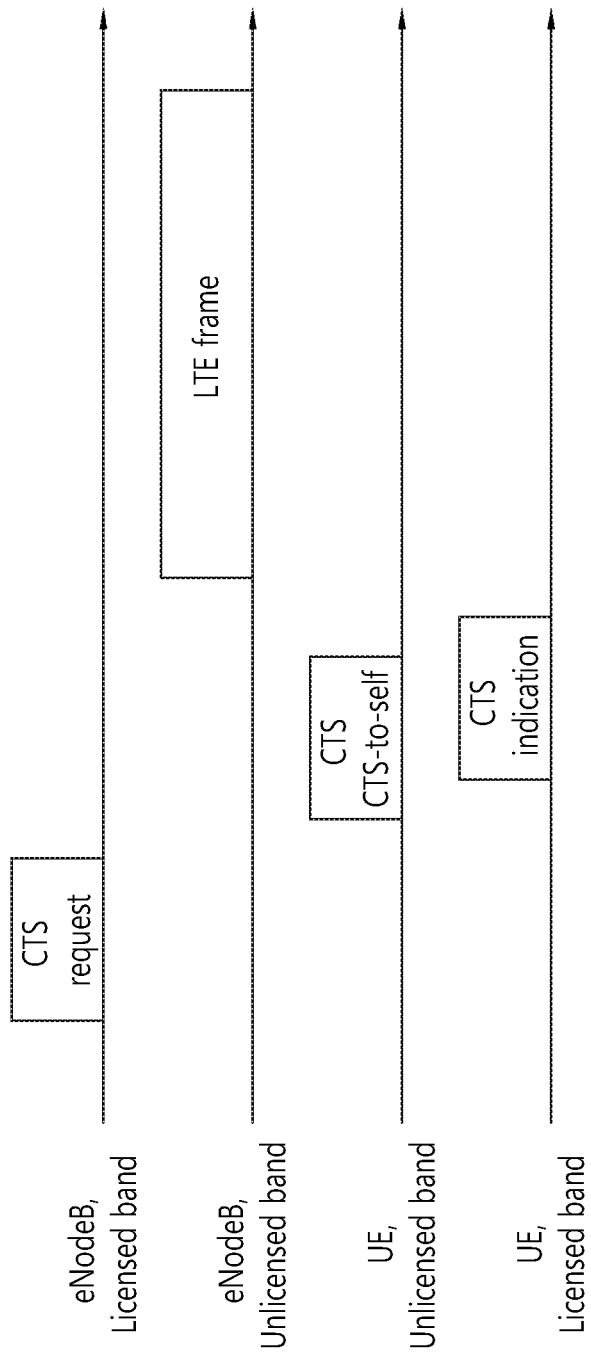
FIG. 24 shows an example of method to transmit the CTS request and the CTS indication related to fourth method of the first disclosure of the present specification.

FIG. 24 Shows an Example of Method to Transmit the CTS Request and the CTS Indication Related to Fourth Method of the First Disclosure of the Present Specification.

As mentioned above, in accordance with fourth method of the first disclosure of the present specification, a terminal using both a licensed band and an unlicensed band for communicating with a mobile communication base station, may receive, through the licensed band and from the base station, the CTS request indication to request a transmission of the CTS frame, and may transmit, through the unlicensed band to the base station, the CTS frame, and may, at a specific frame or a specific subframe, receive, through the unlicensed band and from the base station, a data channel.

Herein, the specific frame or a specific subframe may be the frame (e.g. the LTE frame) used in the mobile communication standard related to the licensed band.

Further, the CTS request indication may be transmitted through a PDCCH or a higher layer signaling.

According to the second disclosure of the present invention, the CTS request indication may include at least one of information on a timing at which the CTS frame is to be transmitted, information on a value of duration included in a duration field of the CTS frame, information on a timing at which a data transmission channel is started, and information on a duration during which the data transmission channel is to be progressed.

Further, in accordance with the second disclosure, the terminal may transmit, through the licensed band to the base station, the CTS indication to indicate that the CTS frame has been transmitted.

Herein, the CTS indication may include at least one of information on a timing at which a data transmission channel is started, and information on a duration during which the data transmission channel is to be progressed.

Specifically, referring to FIG. 23, in the method to occupy the medium such as the fourth method of the first disclosure of the present specification, the base station may transmit, thorough the licensed band (PCell) to the UE, the RTS indication (or the CTS request), (without firstly transmitting the RTS) in order for the base station to transmit data to the UE That UE having received it may transmit the CTS (CTS-to-self) by utilizing information included in the RTS indication (or CTS request).

In addition, the UE may transmit, through the licensed band (PCell), the CTS (CTS-to-self) indication for the base station which would not receive the CTS.

And then, the base station may transmit the LTE frame to the UE at a timing reserved through the RTS indication (or CTS request) and/or the CTS indication.

Figure 25:
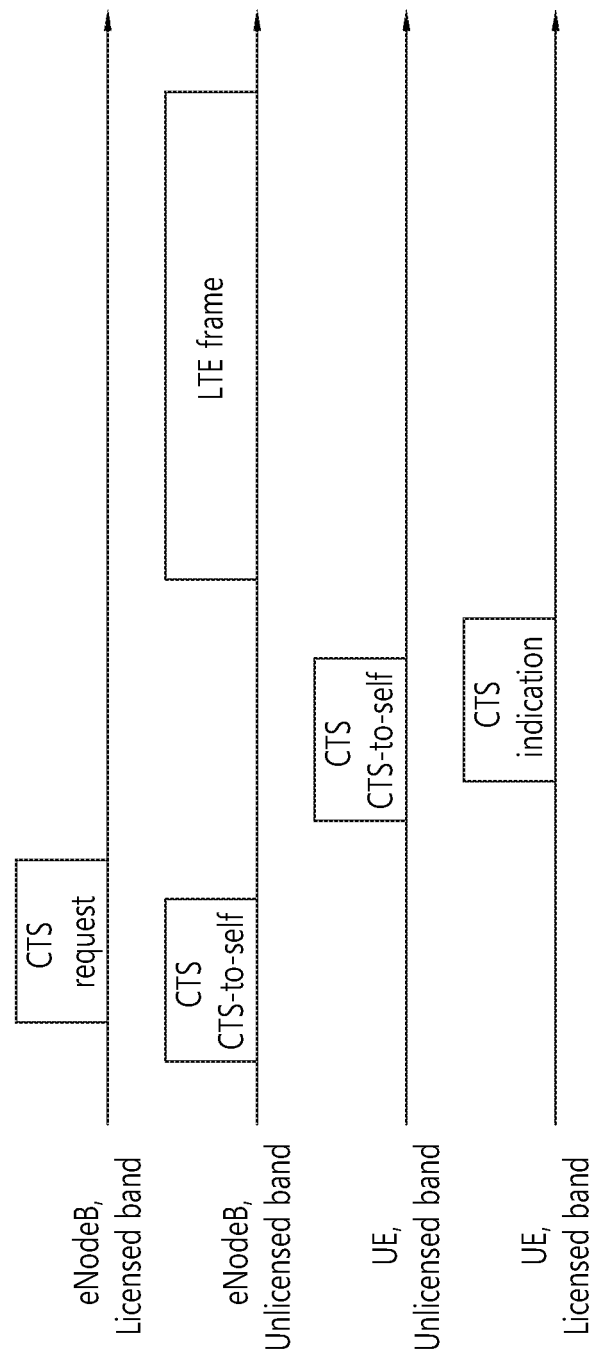
FIG. 25 shows an example of method to transmit the CTS request and the CTS indication related to the fifth method of the first disclosure of the present specification.

FIG. 25 Shows an Example of Method to Transmit the CTS Request and the CTS Indication Related to the Fifth Method of the First Disclosure of the Present Specification.

Referring to FIG. 25, in the method of occupying the medium such as the fifth method of the first disclosure of the present specification, the base station may transmit, through the licensed band (PCell) to the UE, the RTS indication (or CTS request) for the UE which would not receive the CTS/CTS-to-self, after transmitting (together with transmitting) the CTS/CTS-to-self in order for the base station to transmit data to the UE.

That UE having received it may transmit the CTS by utilizing information included in the RTS indication (or CTS request).

In addition, the UE may transmit, through the licensed band (PCell), the CTS indication for the base station which would not receive the CTS.

And then, the base station may transmit the LTE frame to the UE at a timing reserved through the RTS indication (or CTS request) and/or the CTS indication.

4. Transmission of a Preamble Request and a Preamble Indication Through the Licensed Band FIG. 26 Shows an Example of Method to Transmit the Preamble Request and the Preamble Indication in Accordance with the Second Disclosure of the Present Specification.

Figure 26:
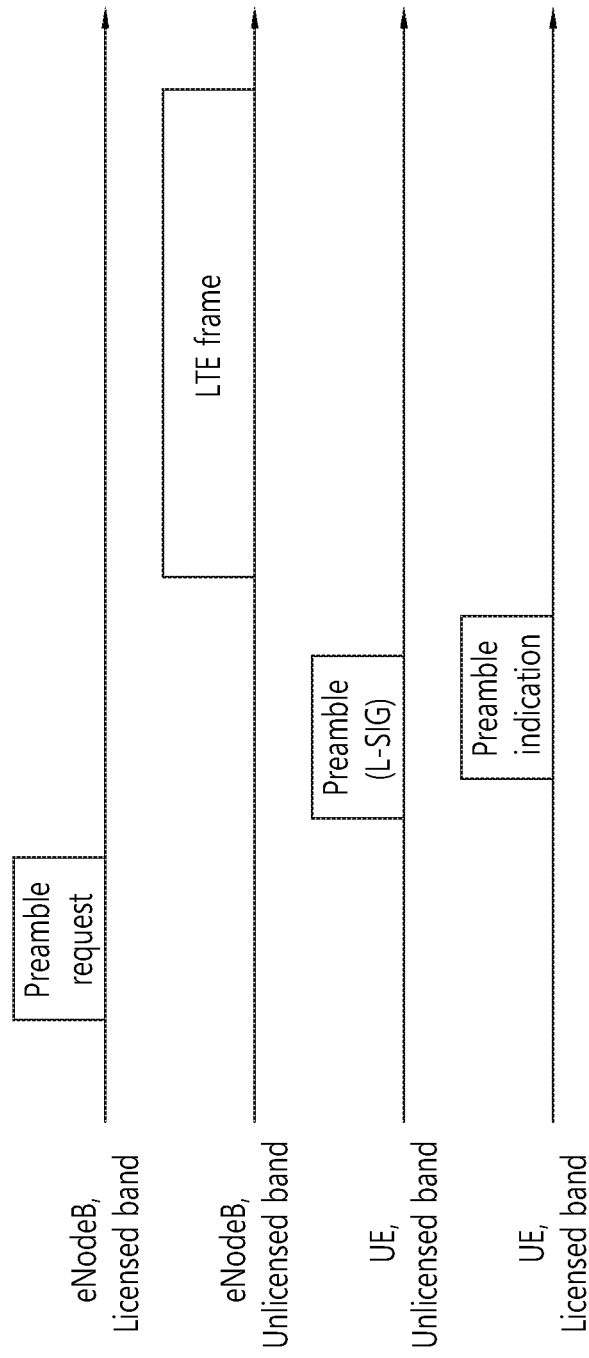
FIG. 26 shows an example of method to transmit the preamble request and the preamble indication, in accordance with the second disclosure of the present specification.

Referring to FIG. 26, in the method of occupying the medium such as the sixth method of the first disclosure of the present specification, the base station may occupy the medium, by transmitting a packet configured for the PLCP preamble and the signal field of the WLAN by the base station and the UE, before transmitting the LTE packet by the base station.

The second disclosure of the present specification, if the base station has data to be transmitted to the UE as shown in FIG. 26, then the base station firstly proposes transmitting, through the licensed band (PCell) to the UE, the preamble request.

In this case, specifically a transmission of the preamble request is done through the PDCCH (DL grant) or the higher layer signaling.

That UE having received the preamble request may transmit a preamble packet. In this case, specifically in the preamble request, the following information may be included.

a-4) information on a timing at which the preamble packet is to be transmitted b-4) a value to include in a length field in the signal field of the preamble packet or a value to indicate the specific value c-4) information on a timing at which a data transmission (LTE frame) is started d-4) information on a duration (e.g. subframe number) during which the data transmission (LTE frame) is to be progressed When the UE having received the preamble request transmits the preamble packet, the length field in the signal field of the preamble packet may be configured using 'information on the value to include in the length field in the signal field of the preamble packet' included in the preamble request information Further, the transmission timing of the preamble packet may be determined using 'timing information at which the preamble packet is to be transmitted' included in the preamble request.

And then, that UE having transmitted the preamble packet may attempt to receive the data frame using the data transmission start timing information and the transmission duration information having been included in the preamble request.

That UE having transmitted the preamble packet may additionally transmit, through the licensed band (PCell), the preamble indication for the base station which would not receive the preamble packet.

In this case, specifically the transmission of the preamble indication may be done through the PUCCH or the higher layer signaling.

If the base station receives the preamble indication from the UE, the base station may be aware that the UE has transmitted the preamble packet, and may transmit data. In this case, specifically the preamble indication transmitted by the UE may include the following information.

a-5) information on a timing at which a data transmission (LTE frame) is started b-5) information on a duration (e.g. subframe number) during which the data transmission (LTE frame) is to be progressed When the base stations having received the preamble indication transmits data, the data transmission may be progressed based on the information on the transmission start time and the transmission duration of the data (LTE frame) included in the preamble indication.

III. A Third Disclosure of the Present Specification

As mentioned above, the third disclosure of the present specification proposes methods to transmit data in a multiple UEs.

Specifically, unlike the (unicast) WLAN system in which only one data packet has transmitted for only one STA unless MU-MIMO scheme is used, the LTE system would simultaneously transmit data to the multiple UEs using OFDMA scheme in a downlink environment.

Thus, if the base station wants to simultaneously transmit data to the multiple UEs even in the unlicensed band, then it is necessary to consider how the base station and the multiple UEs transmit the RTS/CTS/CTS-to-self, occupy the medium, and transmit data.

The method to transmit data by the multiple UEs, in accordance with the third disclosure of the present specification, is as follows.

1. 3-1 Method (a First One of a Plurality of Third Disclosure)

According to 3-1 method, the base station performs occupying the medium, by using a scheme to occupy the medium in accordance with the first method of the present specification, only for the specific UE of a plurality of UEs to which it wants to send data, and then may transmit data to the plurality of UEs upon transmitting actual data (the LTE frame).

2. 3-2 Method (a Second One of a Plurality of Third Disclosure)

Figure 27:
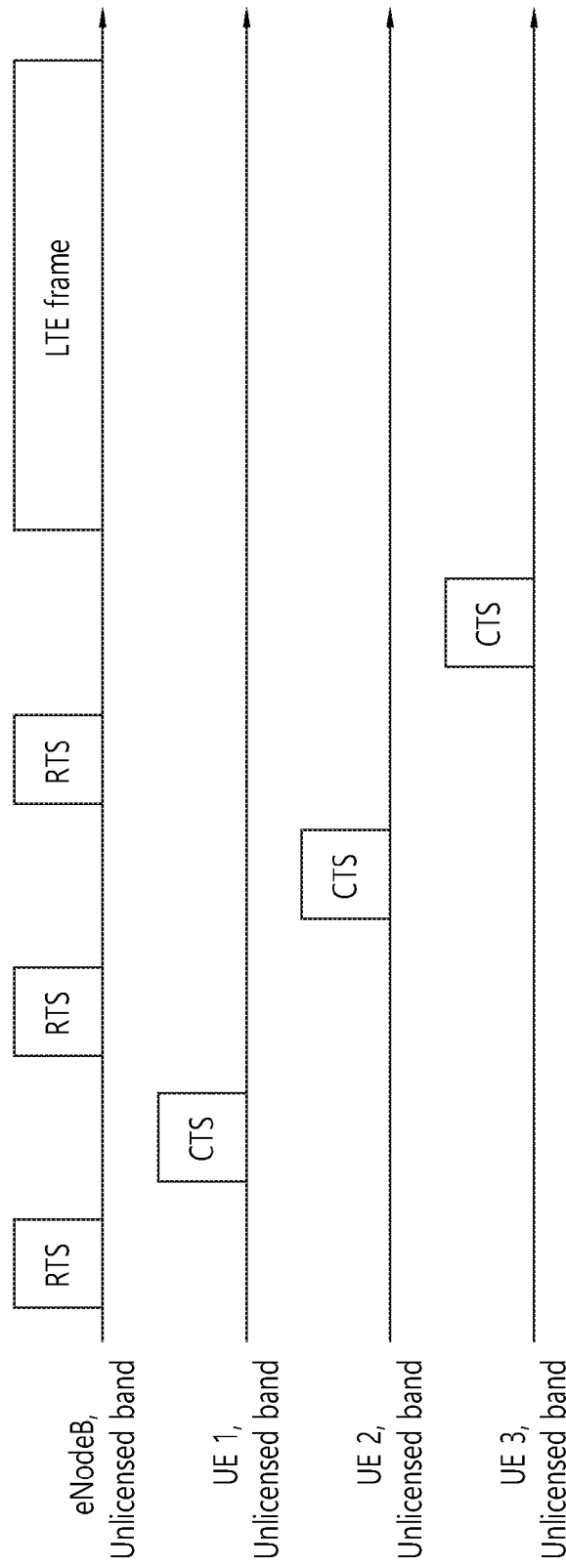
FIG. 27 is an exemplary diagram showing a method to transmit data in the multiple UEs, in accordance with the 3-2 method of the third disclosure of the present disclosure.

FIG. 27 is an Exemplary Diagram Showing a Method to Transmit Data in the Multiple UEs, in Accordance with the 3-2 Method of the Third Disclosure of the Present Disclosure.

Referring to FIG. 27, the 3-2 method is a method in which the base station sequentially exchanges RTS, and CTS with the plurality of UEs to which it wants to send data, and then transmit the data to the plurality of UEs.

3. 3-3 Method (a Third One of a Plurality of Third Disclosure)

Figure 28:
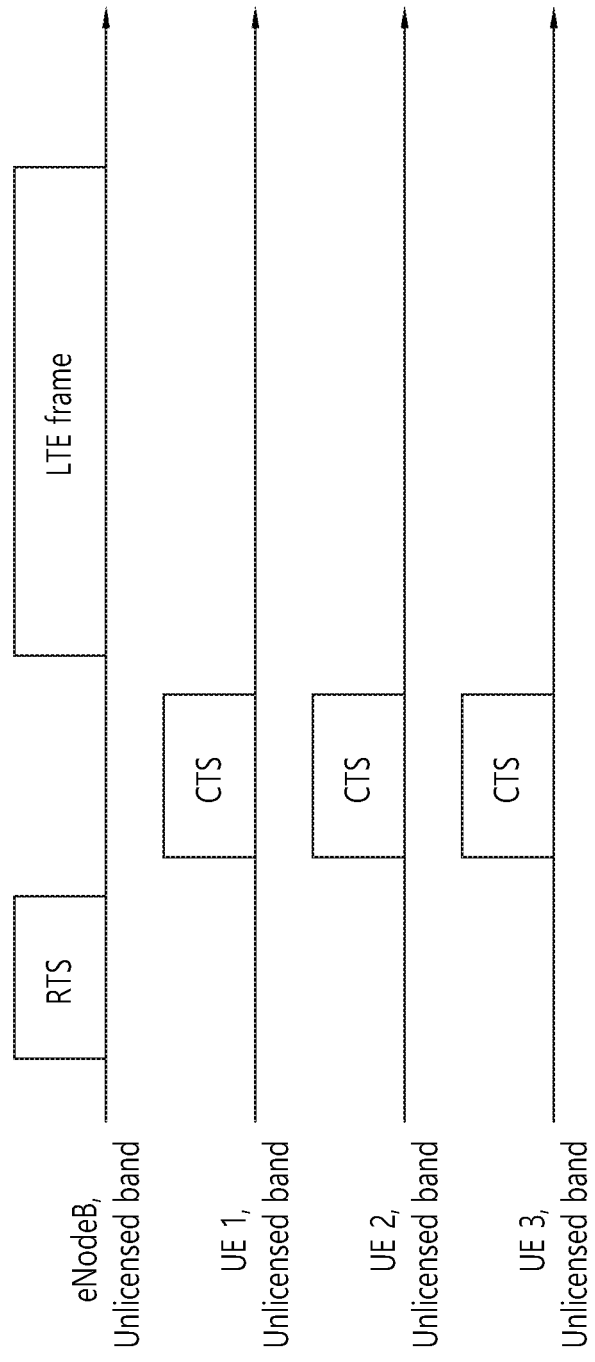
FIG. 28 is an exemplary diagram showing a method to transmit data in the multiple UEs, in accordance with the 3-3 method of the third disclosure of the present disclosure.

FIG. 28 is an Exemplary Diagram Showing a Method to Transmit Data in the Multiple UEs, in Accordance with the 3-3 Method of the Third Disclosure of the Present Disclosure.

Referring to FIG. 28, the 3-3 method is a method in which if the base station transmit the RTS, then the plurality of UEs wishing to transmit data, simultaneously transmit the CTS configured for the same sequence, and then the base station transmit data to the plurality of UEs.

In this case, when considering the UE which a transmission of the WLAN signal is available and its reception is not available, the base station may transmit, through the licensed band (PCell), the RTS indication (or CTS request) to the UE wishing to transmit data, after transmitting (together with transmitting) the RTS by the base station.

That UEs having received it may transmit the CTS configured for the same sequence at the same timing by utilzing information included in the RTS indication (or CTS request).

In addition, the UEs may transmit, through the license band (PCell), the CTS indication for the base stations which would not receive the CTS.

And then, the base station may transmit the LTE frame to the UE at a timing reserved through the RTS indication (or CTS request) and/or the CTS indication.

Meanwhile, when the base station simultaneously transmits data to the multiple UEs even in the unlicensed band, once the medium is occupied, data may be transmitted at a different timing in a TDM manner with the multiple UEs.

Figure 29:
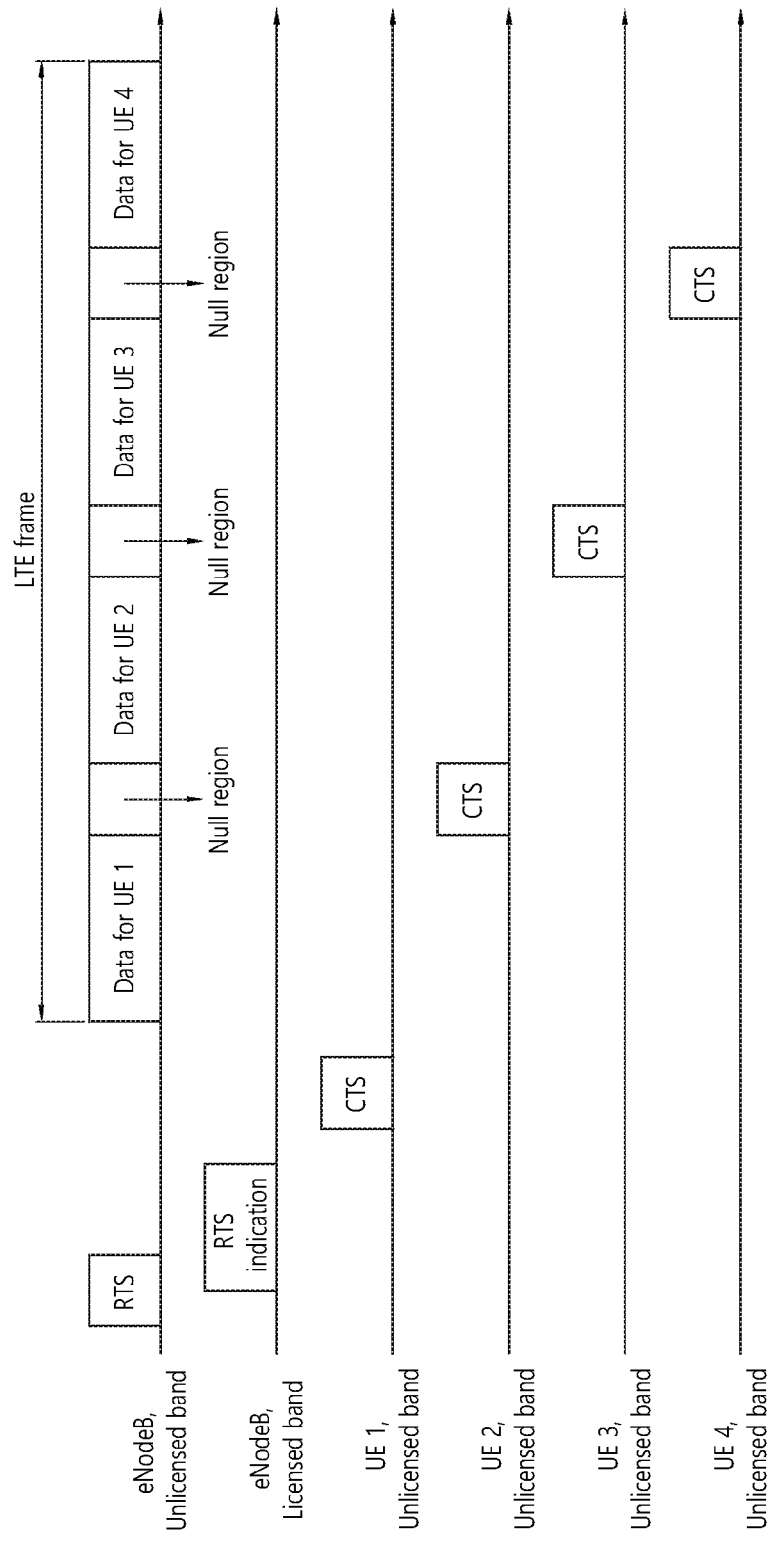
FIG. 29 is an exemplary diagram showing data transmission timing, in accordance with third disclosure of the present disclosure.

FIG. 29 is an Exemplary Diagram Showing Data Transmission Timing in the Multiple UEs, in Accordance with Third Disclosure of the Present Disclosure.

Referring to FIG. 29, the base station may inform the plurality of UEs of a different CTS transmission timing, and if the CTS is transmitted from each of UEs, then it may transmit data to the corresponding UE until a CTS would be transmitted from other UE.

For example, as shown in FIG. 29, when the base station attempts to transmit data to UE1, UE2, UE3, and UE4, the base station inform of each of the UEs of a different CTS transmission timing through the PCell (licensed band) of each of the UEs If the base station Request To Send the CTS in the order of UE1, UE2, UE3, and UE4, and the UE1 firstly transmits the CTS to the base station, then the base station would transmit data to the UE1 for a certain period of time. Afterwards, the UE2 transmits the CTS at the timing when the UE itself would transmit the CTS, and then the base station transmits data to the UE2 after the UE2 transmit the CTS. Similarly, the UE3 and UE4 transmit the CTS at a determined timing, and then the base station would transmit data to the corresponding UE for a certain period of time from when each of UEs transmits the CTS.

In this case, the base station may not transmit a signal, in order to avoid a collision with the CTS transmitted by the UE for the time duration when each of the UEs would transmit the CTS (zero-power transmission).

Further, specifically, a time region (e.g. null region) in which the base station leaves to be empty to transmit for the CTS transmission by the UE, may be one OFDM symbol duration or a duration corresponding to a few OFDM symbols.

Further, the third disclosure of the present invention proposes that the corresponding null region may be always positioned only on the last (or the first) OFDM symbol of subframe.

Further, in this case, the values of the duration field included in the CTS packet transmitted from each of the UEs may not be set as the timing when a transmission of entire data (LTE frame) transmitted from the base station is terminated, but be set as the duration on timing until when a data transmission to each of the UEs is terminated.

Figure 30:
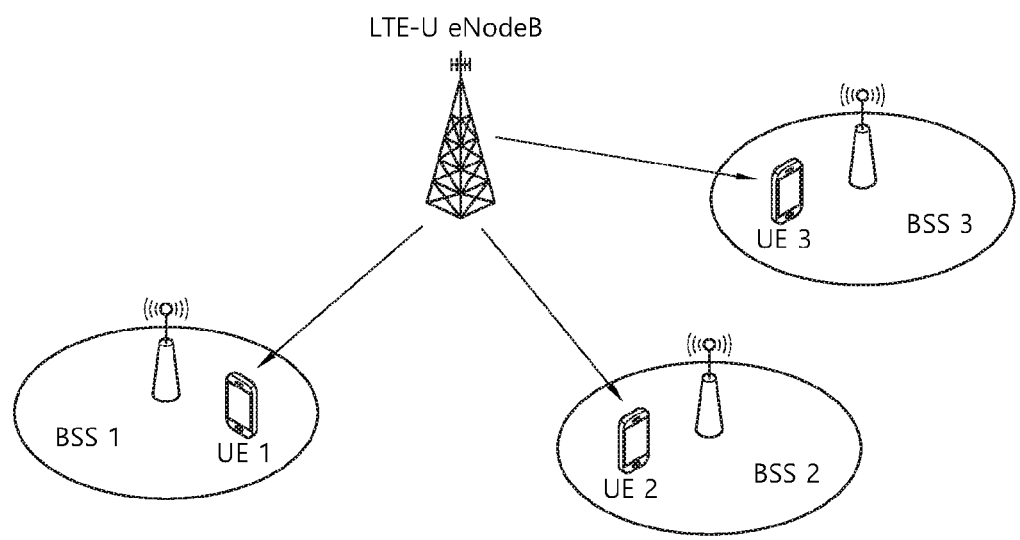
FIG. 30 is an exemplary diagram showing an effect when the data transmission timing in the multiple UEs is applied, in accordance with the third disclosure of the present specification.

FIG. 30 is an Exemplary Diagram Showing an Effect when the Data Transmission Timing in the Multiple UEs is Applied, in Accordance with the Third Disclosure of the Present Specification.

Referring to FIG. 30, when the data transmission timing in multiple UEs is applied, in accordance with the third disclosure of the present specification, if BSSs positioned around each of the UEs are different from each other, and each of the BSSs does not hear a signal transmitted from a LTE-U base station (or does not sense the signal), then UE1, UE2, and UE3 transmits the CTS in advance, and thus avoided may be a situation in which the BSS (surrounding STAs) surrounding UE1, UE2, and UE3 may not transmitted data for the entire duration during which the base station would transmit the data (LTE frame).

That is, each of the UEs may avoid the medium from being occupied in advance unnecessarily for a long time, by transmitting the CTS immediately before data would be transmitted to each of the UEs.

IV. The Fourth Disclosure of the Present Specification

The fourth disclosure of the present specification proposes the RTS and CTS packet structure which may be used in the disclosures of the present specification.

Figure 31:
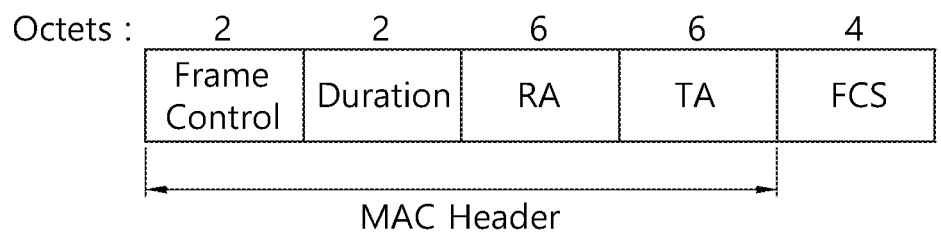
FIG. 31-32 is an exemplary diagram showing a format of the RTS frame and the CTS frame, in accordance with the fourth disclosures of the present specification, respectively.
Figure 32:
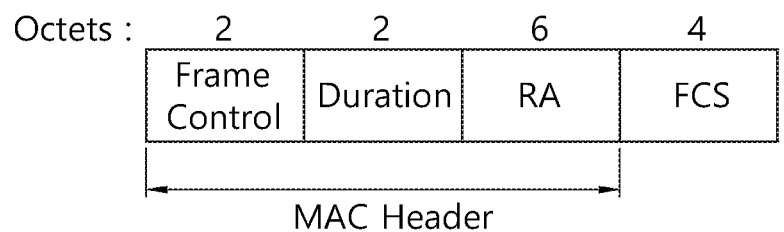

FIG. 31-32 is an Exemplary Diagram Showing a Format of the RTS Frame and the CTS Frame, in Accordance with the Fourth Disclosures of the Present Specification, Respectively.

Referring to FIG. 31-32, RA (Receiver address) field means an address of STA to receive the frame, and TA (Transmitter address) field means an address of STA to transmit the frame.

If the AP transmits the RTS or the CTS to a (non-AP) STA, then a value of BSSID would be used to the TA and, and 48-bits MAC address of the STA would be used to the RA, as the AP is a transmitter.

On the other hand, if the (non-AP) STA transmits the RTS or the CTS to the AP, then the 48-bits MAC address of the STA would be used to the TA, and the value of BSSID would be used to the RA, as the AP is a receiver.

In this case, the fourth disclosure of the present specification proposes that the value of TA and RA applied to the RTS/CTS frame transmitted by the base station and the UE would be used as follows.

1. If the Transmitter or Receiver of the RTS/CTS Frame is the UE (1) If there is a WLAN module in an LTE-U device, then MAC address used in the WLAN module may be used as the TA/RA of the RTS/CTS frame transmitted by the UE.

(2) Or, a specific MAC address (or 48-bits sequence) may be used as the TA/RA.
- In this case, the specific MAC address (or 48-bits sequence) may be a specific value defined in the standard
- In this case, the specific MAC address (or 48-bits sequence) may be a value which is set from the base station through the higher layer signaling (PCell) to the UE.
- In this case, the specific MAC address (or 48-bits sequence) may be a value which is randomly determined by the UE.

(3) The MAC address which is randomly determined (changed) whenever the RTS/CTS is transmitted, may be used as the TA/RA. This is to avoid the address from being collided accidently with that of surrounding STA, when only the specific value may be persistently used as the address.

1. If the Transmitter or Receiver of the RTS/CTS Frame is the Base Station (1) If there is a WLAN module in the base station device, MAC address used in the WLAN module may be used as the TA/RA of the RTS/CTS frame transmitted by the base station.

(2) Or, a specific MAC address (or 48-bits sequence) may be used as the TA/RA.
- In this case, the MAC address (or 48-bits sequence) of the base station may be a specific value defined in the standard
- In this case, the MAC address (or 48-bits sequence) may be determined by the base station, and the base station may inform the UE of the MAC address (or 48-bits sequence) used by the base station through the SIB or the higher layer signaling (PCell).

(3) The MAC address (or 48-bits sequence) which is randomly determined (changed) whenever the RTS/CTS is transmitted, may be used as the TA/RA. This is to avoid the address from being collided accidently with that of surrounding STA/AP, when only the specific value may be persistently used as the address.

(4) The base station may use the corresponding BSSID as its own address, by randomly generating the BSSID which is not used by the surrounding BSSs, and may use it as the TA/RA of the RTS/CTS frame.
- In this case, the base station may inform the UE of the BSSID which is used by the base station through the SIB or the higher layer signaling (PCell).

As mentioned above, embodiments of the present invention may be implemented using various means. For instance, embodiments of the present invention may be implemented using hardware, firmware, software and/or any combinations thereof and so on. Details thereof will be described with reference to the drawing.

Figure 33:
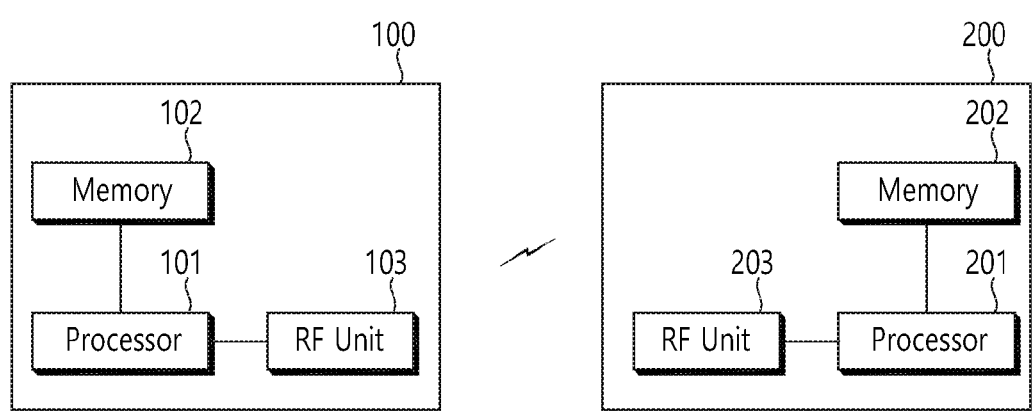
FIG. 33 is a block diagram of a wireless communication system in which the disclosure of the present specification is implemented.

FIG. 33 is a Block Diagram of a Wireless Communication System in which the Disclosure of the Present Specification is Implemented.

A base station 200 may include a processor 201, a memory 202 and a radio frequency (RF) unit 203. The memory 202 is operatively coupled with the processor 201 and stores a variety of information to operate the processor 201. The RF unit 203 is operatively coupled with the processor 201, and transmits and/or receives a radio signal. The processor 201 implements proposed functions, procedures and/or methods. In the above-mentioned embodiment, the operation of the base station may be implemented by the processor 201.

A UE 100 may include a processor 101, a memory 102 and a radio frequency (RF) unit 103. The memory 102 is operatively coupled with the processor 101 and stores a variety of information to operate the processor 101. The RF unit 103 is operatively coupled with the processor 101, and transmits and/or receives a radio signal. The processor 201 implements proposed functions, procedures and/or methods.

The processor may include Application-Specific Integrated Circuits (ASICs), other chipsets, logic circuits, and/or data processors. The memory may include Read-Only Memory (ROM), Random Access Memory (RAM), flash memory, memory cards, storage media and/or other storage devices. The RF unit may include a baseband circuit for processing a radio signal. When the above-described embodiment is implemented in software, the above-described scheme may be implemented using a module (process or function) which performs the above function. The module may be stored in the memory and executed by the processor. The memory may be disposed to the processor internally or externally and connected to the processor using a variety of well-known means.

In the above exemplary systems, although the methods have been described on the basis of the flowcharts using a series of the steps or blocks, the present invention is not limited to the sequence of the steps, and some of the steps may be performed at different sequences from the remaining steps or may be performed simultaneously with the remaining steps. Furthermore, those skilled in the art will understand that the steps shown in the flowcharts are not exclusive and may include other steps or one or more steps of the flowcharts may be deleted without affecting the scope of the present invention.

What is claimed is:

1. A method of receiving data by a terminal using both a licensed band and an unlicensed band for communicating with a mobile communication base station, the method comprising:
    receiving, through the licensed band and from the base station, a Clear To Send (CTS) request for requesting the terminal to transmit a CTS frame defined by a Wireless LAN (WLAN) system;
    transmitting, through the unlicensed band, the CTS frame, before receiving a data channel from the mobile communication base station; and
    receiving, through the unlicensed band and from the mobile communication base station, a data channel at a specific frame or a specific subframe, after transmitting the CTS frame, and
    wherein the specific frame or a specific subframe by which the data channel is received, is a frame or a subframe used in a mobile communication system by which is operated on the licensed band, and
    wherein the CTS request includes at least one of information on a timing at which the CTS frame is to be transmitted, information on a value of duration included in a duration field of the CTS frame, information on a timing at which a data transmission channel is started, or information on a duration during which the data transmission channel is to be progressed.

2. The method of claim 1, wherein the mobile communication system is a LTE (Long Term Evolution) or a LTE-A (Long Term Evolution-Advanced) system.

3. The method of claim 1, wherein the CTS request is received through a PDCCH or a higher layer signaling.

4. The method of claim 1, further comprising transmitting, to the base station through the licensed band, a CTS indication to indicate that the CTS frame has been transmitted.

5. The method of claim 4, wherein the CTS indication includes at least one of information on a timing at which a data transmission channel is started, or information on a duration during which the data transmission channel is to be progressed.

6. A terminal using both a licensed band and an unlicensed band for communicating with a mobile communication base station, comprising
    a Radio Frequency (RF) unit; and
    a processor configured to control the RF unit to:
        receive, through the licensed band and from the base station, a Clear To Send (CTS) request for requesting the terminal to transmit a CTS frame defined by a Wireless LAN (WLAN) system;
        transmit, through the unlicensed band, the CTS frame, before receiving a data channel from the mobile communication base station; and
        receive, through the unlicensed band and from the mobile communication base station, a data channel at a specific frame or a specific subframe, after transmitting the CTS frame, and
        wherein the specific frame or a specific subframe by which the data channel is received, is a frame or a subframe used in a mobile communication system by which is operated on the licensed band, and
        wherein the CTS request includes at least one of information on a timing at which the CTS frame is to be transmitted, information on a value of duration included in a duration field of the CTS frame, information on a timing at which a data transmission channel is started, or information on a duration during which the data transmission channel is to be progressed.

7. The terminal of claim 6, wherein the mobile communication system is a LTE (Long Term Evolution) or a LTE-A (Long Term Evolution-Advanced) system.

8. The terminal of claim 6, wherein the CTS request is received through a PDCCH or a higher layer signaling.

9. The terminal of claim 6, wherein the processor further configured to control the RF unit to transmit, to the base station through the licensed band, a CTS indication to indicate that the CTS frame has been transmitted.

10. The terminal of claim 9, wherein the CTS indication includes at least one of information on a timing at which a data transmission channel is started, or information on a duration during which the data transmission channel is to be progressed.

* * * * *